United States Patent
France et al.

(10) Patent No.: US 9,324,003 B2
(45) Date of Patent: Apr. 26, 2016

(54) LOCATION OF IMAGE CAPTURE DEVICE AND OBJECT FEATURES IN A CAPTURED IMAGE

(71) Applicant: Trimble Navigation Limited, Sunnyvale, CA (US)

(72) Inventors: Peter G. France, Christchurch (NZ); Shawn D. Weisenburger, Denver, CO (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

(21) Appl. No.: 13/829,085

(22) Filed: Mar. 14, 2013

(65) Prior Publication Data

US 2013/0243250 A1    Sep. 19, 2013

Related U.S. Application Data

(63) Continuation-in-part of application No. 12/559,322, filed on Sep. 14, 2009, now Pat. No. 8,942,483.

(60) Provisional application No. 61/641,792, filed on May 2, 2012.

(51) Int. Cl.
   *G06K 9/46*    (2006.01)
   *G01C 15/00*   (2006.01)
   *G06K 9/00*    (2006.01)

(52) U.S. Cl.
   CPC  *G06K 9/46* (2013.01); *G01C 15/00* (2013.01); *G06K 9/00664* (2013.01)

(58) Field of Classification Search
   CPC ....... G06K 9/46; G06K 9/32; G06K 9/00523; G06F 17/30241; G06T 1/00; G06T 7/0028; G06T 7/004; G01S 5/0252; G01S 5/06; G01S 5/04; G01S 19/42; G09G 2340/12; H04M 1/72572; H04M 2250/10; H04M 2250/12; Y10S 707/99943; H04W 4/021; H04W 4/028; H04N 21/278
   USPC .......... 382/113, 195, 233, 294, 305; 348/113, 348/117, 118, 130, 143, 153, 239, 573
   See application file for complete search history.

(56) References Cited

U.S. PATENT DOCUMENTS 5,003,329 A    3/1991   Itabashi
5,087,916 A    2/1992   Metzdorff et al.
(Continued)

FOREIGN PATENT DOCUMENTS

JP    2009-140402      6/2009
KR    10-2009-0002531  1/2009

OTHER PUBLICATIONS

"You City", www.youcity.com, (2009).
(Continued)

*Primary Examiner* — Vu Le
*Assistant Examiner* — Aklilu Woldemariam
(74) *Attorney, Agent, or Firm* — Kilpatrick Townsend & Stockton LLP

(57) ABSTRACT

A method for matching a region on an object of interest with a geolocation in a coordinate system is disclosed. In one embodiment, an image of a region on an object of interest is captured on an image capture device. The image is processed to detect a located feature using a feature detection algorithm. Further processing of the located feature is performed to derive a first feature descriptor using a feature descriptor extraction algorithm. The feature descriptor is stored in a memory. A database of feature descriptors having geolocation information associated with the feature descriptors is searched for a match to the first feature descriptor. The geolocation information is then made available for access.

41 Claims, 9 Drawing Sheets

(56) References Cited

U.S. PATENT DOCUMENTS

| | | | |
|---|---|---|---|
| 5,103,250 A | 4/1992 | Arifuku et al. | |
| 5,247,356 A | 9/1993 | Ciampa | |
| 5,427,356 A | 6/1995 | Krotov et al. | |
| 5,506,644 A | 4/1996 | Suzuki et al. | |
| 5,517,419 A | 5/1996 | Lanckton et al. | |
| 5,581,299 A | 12/1996 | Raney | |
| 5,596,494 A | 1/1997 | Kuo | |
| 5,633,946 A | 5/1997 | Lachinski et al. | |
| 5,646,207 A | 7/1997 | Schell | |
| 5,689,742 A | 11/1997 | Chamberlain | |
| 5,719,773 A | 2/1998 | Choate | |
| 5,768,640 A | 6/1998 | Takahashi et al. | |
| 5,845,161 A | 12/1998 | Schrock et al. | |
| 5,897,728 A | 4/1999 | Cole et al. | |
| 5,902,347 A | 5/1999 | Backman et al. | |
| 5,913,078 A | 6/1999 | Kimura et al. | |
| 5,966,122 A | 10/1999 | Itoh | |
| 5,991,690 A | 11/1999 | Murphy | |
| 5,995,681 A * | 11/1999 | Lee et al. | 382/293 |
| 6,009,359 A | 12/1999 | El-Hakim et al. | |
| 6,038,074 A * | 3/2000 | Kitaguchi et al. | 359/618 |
| 6,076,917 A | 6/2000 | Wen | |
| 6,128,446 A | 10/2000 | Schrock et al. | |
| 6,222,985 B1 | 4/2001 | Miyake et al. | |
| 6,282,362 B1 | 8/2001 | Murphy et al. | |
| 6,337,951 B1 | 1/2002 | Nakamura | |
| 6,346,980 B1 | 2/2002 | Tani et al. | |
| 6,401,069 B1 | 6/2002 | Boys et al. | |
| 6,504,571 B1 | 1/2003 | Narayanaswami et al. | |
| 6,542,813 B1 | 4/2003 | Kovacs | |
| 6,574,561 B2 | 6/2003 | Alexander et al. | |
| 6,577,275 B2 | 6/2003 | Turner | |
| 6,597,818 B2 | 7/2003 | Kumar et al. | |
| 6,678,692 B1 * | 1/2004 | Hyatt | 707/758 |
| 6,690,883 B2 | 2/2004 | Pelletier | |
| 6,732,162 B1 | 5/2004 | Wood et al. | |
| 6,741,948 B2 | 5/2004 | Hauger et al. | |
| 6,757,445 B1 | 6/2004 | Knopp | |
| 6,826,172 B1 * | 11/2004 | Augart | 370/351 |
| 6,868,340 B2 | 3/2005 | Alexander et al. | |
| 6,904,160 B2 | 6/2005 | Burgess | |
| 6,993,196 B2 | 1/2006 | Sun et al. | |
| 7,003,138 B2 | 2/2006 | Wilson | |
| 7,038,681 B2 | 5/2006 | Scott et al. | |
| 7,099,492 B2 | 8/2006 | Rhoads | |
| 7,106,328 B2 | 9/2006 | Royan | |
| 7,148,898 B1 | 12/2006 | Howard et al. | |
| 7,161,604 B2 | 1/2007 | Higgins et al. | |
| 7,167,187 B2 | 1/2007 | Scott et al. | |
| 7,171,389 B2 | 1/2007 | Harrison | |
| 7,191,056 B2 | 3/2007 | Costello et al. | |
| 7,197,160 B2 | 3/2007 | Rhoads et al. | |
| 7,234,106 B2 | 6/2007 | Simske | |
| 7,248,285 B2 | 7/2007 | Needham | |
| 7,283,975 B2 | 10/2007 | Broughton | |
| 7,313,604 B2 | 12/2007 | Wood et al. | |
| 7,411,493 B2 | 8/2008 | Smith | |
| 7,424,335 B2 | 9/2008 | Swift | |
| 7,465,323 B2 | 12/2008 | Au et al. | |
| 7,466,244 B2 | 12/2008 | Kimchi et al. | |
| 7,482,973 B2 | 1/2009 | Tucker et al. | |
| 7,502,490 B2 | 3/2009 | Rhoads et al. | |
| 7,508,840 B2 | 3/2009 | Delaney | |
| 7,541,975 B2 | 6/2009 | Sever et al. | |
| 7,617,246 B2 | 11/2009 | Koch et al. | |
| 7,630,737 B2 | 12/2009 | Pande et al. | |
| 7,634,380 B2 | 12/2009 | Martin | |
| 7,663,671 B2 | 2/2010 | Gallagher et al. | |
| 7,664,233 B1 | 2/2010 | Kirchmeier et al. | |
| 7,720,703 B1 | 5/2010 | Broughton | |
| 7,724,130 B2 | 5/2010 | Norstrom et al. | |
| 7,813,741 B2 | 10/2010 | Hendrey et al. | |
| 7,872,669 B2 | 1/2011 | Darrell et al. | |
| 7,899,272 B1 | 3/2011 | Hsu | |
| 8,018,376 B2 | 9/2011 | McClure et al. | |
| 8,108,144 B2 | 1/2012 | Forstall et al. | |
| 8,131,118 B1 | 3/2012 | Jing et al. | |
| 8,314,683 B2 | 11/2012 | Pfeffer et al. | |
| 8,347,202 B1 * | 1/2013 | Vespe et al. | 715/200 |
| 8,351,704 B2 | 1/2013 | Kmiecik et al. | |
| 8,385,964 B2 | 2/2013 | Haney | |
| 8,405,740 B2 | 3/2013 | Nichols et al. | |
| 8,520,979 B2 | 8/2013 | Conwell | |
| 8,525,088 B1 | 9/2013 | Ell et al. | |
| 8,564,643 B1 | 10/2013 | Maali et al. | |
| 8,611,677 B2 | 12/2013 | Das et al. | |
| 8,787,700 B1 * | 7/2014 | Aly et al. | 382/294 |
| 8,788,496 B2 | 7/2014 | Darby et al. | |
| 8,897,541 B2 | 11/2014 | France et al. | |
| 8,942,483 B2 | 1/2015 | France et al. | |
| 8,989,502 B2 | 3/2015 | France et al. | |
| 9,042,657 B2 | 5/2015 | France et al. | |
| 2001/0024174 A1 | 9/2001 | Turner | |
| 2001/0026271 A1 | 10/2001 | Higgins et al. | |
| 2001/0028348 A1 | 10/2001 | Higgins et al. | |
| 2002/0120424 A1 | 8/2002 | Hauger et al. | |
| 2002/0198736 A1 | 12/2002 | Harrison | |
| 2003/0052896 A1 | 3/2003 | Higgins et al. | |
| 2003/0068071 A1 | 4/2003 | Wilson | |
| 2003/0202104 A1 | 10/2003 | Werner | |
| 2004/0008866 A1 | 1/2004 | Rhoads et al. | |
| 2004/0032531 A1 | 2/2004 | Mercier | |
| 2004/0161131 A1 | 8/2004 | Rhoads | |
| 2004/0168148 A1 | 8/2004 | Goncalves et al. | |
| 2004/0203571 A1 | 10/2004 | Hashizume | |
| 2005/0031197 A1 | 2/2005 | Knopp | |
| 2005/0034062 A1 | 2/2005 | Bufkin et al. | |
| 2005/0073532 A1 | 4/2005 | Scott et al. | |
| 2005/0108261 A1 | 5/2005 | Glassy et al. | |
| 2005/0209815 A1 | 9/2005 | Russon et al. | |
| 2005/0223337 A1 | 10/2005 | Wheeler et al. | |
| 2006/0041375 A1 | 2/2006 | Witmer et al. | |
| 2006/0061595 A1 | 3/2006 | Goede et al. | |
| 2006/0111143 A1 | 5/2006 | Pande et al. | |
| 2006/0217105 A1 | 9/2006 | Kumar | |
| 2006/0240814 A1 | 10/2006 | Cutler | |
| 2007/0010924 A1 | 1/2007 | Otani et al. | |
| 2007/0011982 A1 | 1/2007 | Swift | |
| 2007/0025591 A1 | 2/2007 | Rhoads et al. | |
| 2007/0076920 A1 | 4/2007 | Ofek | |
| 2007/0115373 A1 | 5/2007 | Gallagher et al. | |
| 2008/0043020 A1 | 2/2008 | Snow et al. | |
| 2008/0089558 A1 | 4/2008 | Vadon et al. | |
| 2008/0125920 A1 | 5/2008 | Miles et al. | |
| 2008/0258881 A1 | 10/2008 | Manson et al. | |
| 2008/0258967 A1 | 10/2008 | Manson et al. | |
| 2008/0261627 A1 | 10/2008 | Manson et al. | |
| 2008/0262727 A1 | 10/2008 | Manson et al. | |
| 2008/0262733 A1 | 10/2008 | Manson et al. | |
| 2008/0262734 A1 | 10/2008 | Manson et al. | |
| 2008/0263097 A1 | 10/2008 | Manson et al. | |
| 2008/0263174 A1 | 10/2008 | Manson et al. | |
| 2008/0274752 A1 * | 11/2008 | Houri | 455/456.1 |
| 2008/0284587 A1 | 11/2008 | Saigh et al. | |
| 2009/0008554 A1 * | 1/2009 | Weir et al. | 250/338.1 |
| 2009/0132316 A1 | 5/2009 | Florance et al. | |
| 2009/0174768 A1 | 7/2009 | Blackburn et al. | |
| 2009/0251366 A1 | 10/2009 | McClure et al. | |
| 2010/0046842 A1 | 2/2010 | Conwell | |
| 2010/0124378 A1 | 5/2010 | Das et al. | |
| 2010/0208937 A1 | 8/2010 | Kmiecik et al. | |
| 2010/0250136 A1 | 9/2010 | Chen | |
| 2010/0303338 A1 * | 12/2010 | Stojancic et al. | 382/154 |
| 2010/0318515 A1 * | 12/2010 | Ramanathan et al. | 707/723 |
| 2011/0064312 A1 | 3/2011 | Janky et al. | |
| 2011/0143707 A1 | 6/2011 | Darby et al. | |
| 2011/0235923 A1 | 9/2011 | Weisenburger et al. | |
| 2011/0282578 A1 | 11/2011 | Miksa et al. | |
| 2012/0089304 A1 | 4/2012 | Hamilton et al. | |
| 2012/0200697 A1 | 8/2012 | Wuestefeld et al. | |
| 2012/0327252 A1 | 12/2012 | Nichols et al. | |

(56) References Cited

U.S. PATENT DOCUMENTS

2013/0191385 A1* 7/2013 Vespe et al. .................. 707/736
2013/0243250 A1 9/2013 France et al.
2015/0170368 A1 6/2015 Janky et al.

OTHER PUBLICATIONS

"UpNext: 3D Local Search and Community.", www.upnext.com, (2009).
Gruen, Armin et al., "Algorithms for Automated Extraction of Man-Made Objects from Raster Image Data in a GIS", *Institute of Geodesy & Photogrammetry, Swiss Federal Institute of Technology*, 1 page.
Luhmann, T. et al., "Close Range Photogrammetry", *Whittles Publishing*, ISBN 0-470-10633-6, (2006).
Mostafa, Mohamed M., "Digital Image Georeferencing From a Multiple Camera Source by GNS/INS", *ISPRS Journal of Photogrammetry and Remote Sensing*, vol. 56, Issue 1, (Jun. 2001), 12 pages.
Schwarz, Klaus-Peter "Aircraft Position and Attitude Determination by GPS and INS", *International Archives of Photogrammetry and Remote Sensing*, vol. XXXI, Part B6, Vienna., (1996), 7 pages.
Qtaishat, K. S., "Assessing the Performance of Different Direct-Georeferencing Strategies", *Institute of Engineering Surveying and Space Geodesy*, University of Nottingham, ASPRS 2006 Annual Congference, Reno, NV, (May 2006), 9 pages.
Pawelka, Elizabeth "Make your 3270 applications accessible from PDAs and cell phones", CCR2: A Publication for the IBM System z Software Community, Issue 6., (2008), 6 pages.
"PCT/US2010/051015 PCT Search Report and Written Opinion", (Apr. 29, 2011), 10 pages.
Agrios, Bronwyn et al., "Get in Touch with Volunteered Geographic Information", *ArcUser* www.esri.com, (Summer 2010), 50-55.
Schwarz, "Aircraft Position and Altitude Determination by "GPS and INS"", International Archives of Photogrammetry and Remote Sensing, vol. XXXI, Part B6, Vienna, 1996, 7 pages.

* cited by examiner

US 9,324,003 B2

LOCATION OF IMAGE CAPTURE DEVICE AND OBJECT FEATURES IN A CAPTURED IMAGE

RELATED APPLICATIONS

The present application is a continuation in part application of U.S. patent application Ser. No. 12/559,322, entitled "IMAGE-BASED GEOREFERENCING," with filing date Sep. 14, 2009, by James M. Janky, et al, assigned to the assignee of the present application, and hereby incorporated by reference in its entirety.

The present application claims priority to U.S. Provisional Application Ser. No. 61/641,792, entitled "Location of Image Capture Device and Object Features on a Captured Image," with filing date May 2, 2012, by Peter G. France, assigned to the assignee of the present application, and hereby incorporated by reference in its entirety.

This application is also related to co-pending U.S. patent application Ser. No. 13/152,996 filed on Jun. 3, 2011 entitled "ACCURATE DIGITIZATION OF A GEOREFERENCED IMAGE" by James Janky, and assigned to the assignee of the present application; the disclosure of which is hereby incorporated herein by reference in its entirety.

This application is also related to co-pending U.S. patent application Ser. No. 13/799,266 filed on Mar. 13, 2013 entitled "IMAGE-BASED GEOREFERENCING" by James Janky, et al, and assigned to the assignee of the present application; the disclosure of which is hereby incorporated herein by reference in its entirety.

This application is also related to co-pending U.S. patent application Ser. No. 13/799,371 filed on Mar. 13, 2013 entitled "IMAGE-BASED GEOREFERENCING" by James Janky, et al, and assigned to the assignee of the present application; the disclosure of which is hereby incorporated herein by reference in its entirety.

BACKGROUND

The increase in computational power available on handheld computing devices (e.g., personal digital assistants (PDAs), laptop computers, tablet computers, cellular telephones, data recorders, etc.) makes it feasible to perform feature identification, generate feature descriptors, perform descriptor matching, and perform spatial resection calculations on a mobile device based upon an image captured by that device.

BRIEF DESCRIPTION OF THE DRAWINGS

The accompanying drawings, which are incorporated in and form a part of this specification, illustrate various embodiments of the present invention and, together with the description of embodiments, serve to explain principles discussed below. The drawings referred to in this brief description of the drawings should not be understood as being drawn to scale unless specifically noted.

DESCRIPTION OF EMBODIMENTS

Figure 1:
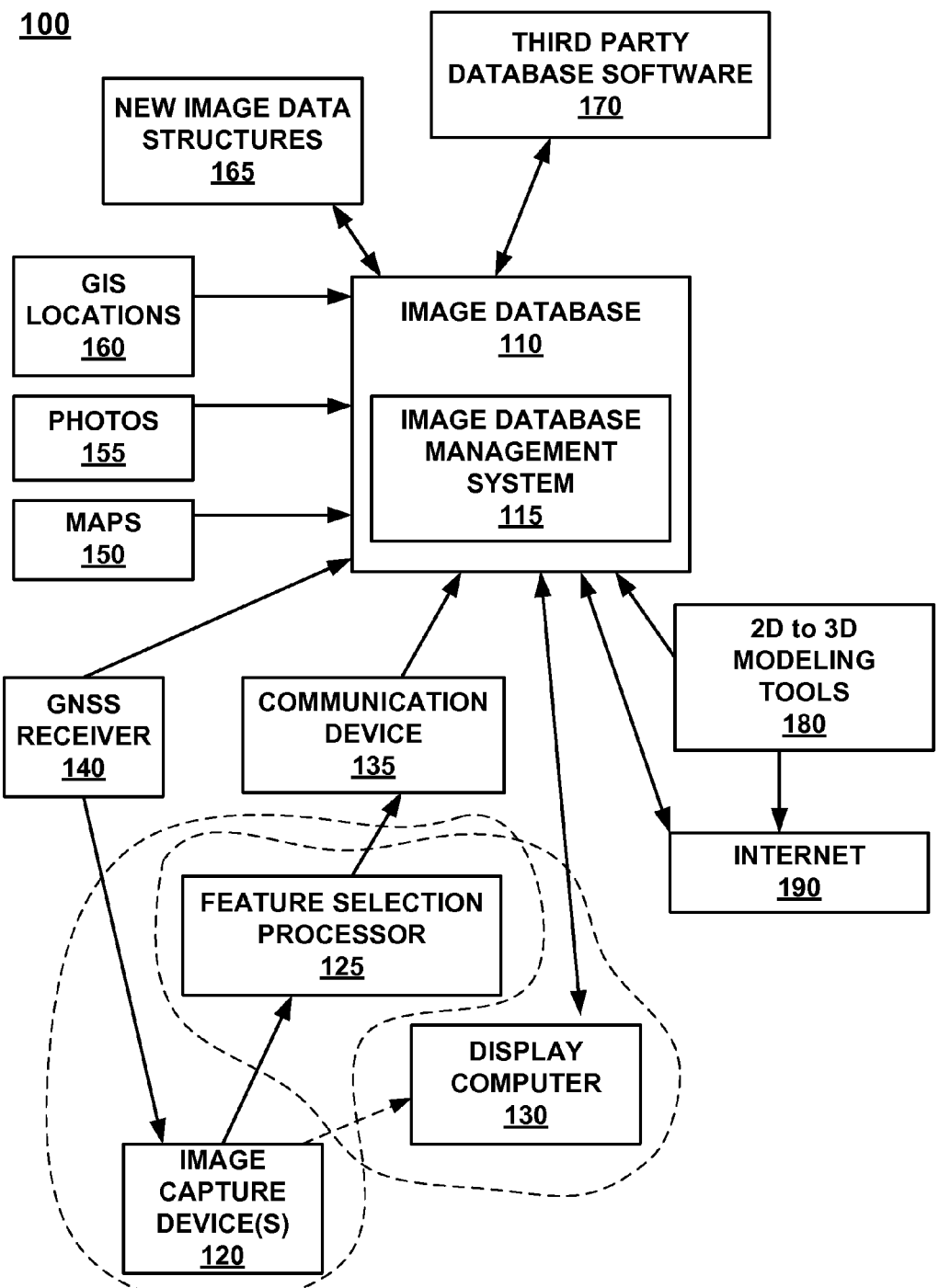
FIG. 1 is an example image-based georeferencing system, in accordance with an embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the present Description of Embodiments, discussions utilizing terms such as "capturing," "processing", "storing," "searching," "making," "sending," "matching," "determining," "conveying," "selecting," "using," or the like, often refer to the actions and processes of an electronic computing device or system, such as an image-based georeferencing system, an image database, an image database management system, a digital camera, a video camera, a computer system, and/or a multimedia device, among others. "Georeferencing" generally means associating a location in a selected reference system with a particular point, either in space or on an object. There are several well-known such reference systems, including latitude, longitude, and elevation, as well as northing and easting from a particular reference point. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

There are two principal kinds of "views" described herein: elevation view and aerial view. Elevation view in its strict definition means an orthographic rectified representation of a structure, usually as viewed from ground level. Camera images/photographs not yet rectified for orthographic presentation and not strictly elevation views, but instead are referred to herein as 'façade views.'

Aerial views are images taken from above the objects of interest, often from airplanes or satellites, and themselves may be rectified or otherwise rendered to become orthographic. However, many image databases shown them without such rectification, thus often showing the elevation/façades of buildings in a foreshortened view. It is appreciated that an plan view such as from a blueprint or engineering drawing also falls into the category of aerial views as described herein.

In an image-based georeference system, finding a match between features on objects in a first image and corresponding features on the same objects in a second image must be done with some degree of confidence. Mathematically, the process used to effect this match is known as correlation. Herein, use of the word "correlated" means that two images of the same objects, as viewed from different viewpoints, contain common features or points. Correlation is the process employed to determine if two images are correlated. The mathematics associated with image correlation methods are well-known in the image-processing arts.

Overview of Discussion

Herein, an image-based georeferencing system is described that includes a database of georeferenced images and a specialized image database management system for processing selected/received images to geolocate and augment/annotate points within the received/selected images via comparison and correlation with existing georeferenced image information (e.g., from the image database). In this manner, embodiments described herein provide geospatial and geographic information system (GIS) and survey users access to precise geolocation of a large number of features/points of interest that can be identified in images. Such quantified features also open a variety of geolocation information to other "amateur" users such as tourists, hikers, automobile drivers, geocachers, and the like. Such features allow users/customers of an image-based georeferencing system to use a suitable camera to take a photograph and then use the image-based georeferencing system and the contents of the photograph to make precise measurements of geolocations of features of interest in the photograph. This geolocation information can be used in a variety of projects that in the past required more specialized and more expensive measurement equipment.

There is a professional need for the geospatial information which can be provided by the system and methods described herein. For example, image databases, such as overhead or aerial image databases that include predominantly or exclusively two-dimensional location data (e.g., latitude and longitude type data) can be readily supplemented with a third, Z-dimension, of height or altitude data associated with points of interest of the represented image content via the techniques, methods, and systems disclosed herein. Many features of GIS databases can likewise be supplemented with additional geospatial information via the techniques, methods, and systems disclosed herein. Adding a reliable Z-dimension to such databases means that the predominantly two-dimensional world of GIS practitioners can make a transition to the three-dimensional world of geospatial information science where objects are located in three-dimensional space.

Discussion will begin with a description of an example block diagram of an image-based georeferencing system including an image database and an image database management system. More detailed discussion will focus on the components of the image database management system and on several example cameras which may be utilized with embodiments described herein. A series of images will be described to illustrate concepts of image-based georeferencing and close-range photogrammetry. Discussion will move to description of an example computer system with which or upon which various embodiments of the present invention can be implemented. Finally, location of image capture devices and object features in a captured image as well as various methods of implementation will be described.

Image-Based Georeferencing System

FIG. 1 is an example image-based georeferencing system 100, in accordance with an embodiment. As shown in FIG. 1, image-based georeferencing system 100 includes an image database 110 and an image database management system 115. In various embodiments, system 100 is communicatively coupled with one or more of: a camera 120, a feature selection processor 125, a display computer 130, a Global Navigation Satellite System (GNSS) receiver 140, maps 150, photos 155, Geographic Information System (GIS) locations 160, new image data structure(s) 165, third party database software 170, 2D-3D modeling tools 180, and the Internet 190.

Image database 110 comprises a database of georeferenced images of terrestrial scenes. The images of image database 110 include one or more features within each image that are geolocated to a coordinate system, such as a county GIS grid; World Geodetic System (WGS)-84; a latitude, longitude (and elevation); and the like. The images included in image database 110 include panoramic images; orthophotos (e.g., plan view type aerial and satellite images); facade or street view images (e.g., elevation type images); raster images; models, interior images and/or blueprints (e.g., Computer Aided Drafting/Engineering files), vehicle-based surveys (e.g., Google StreetView™, the Trident-3D™ product by Trimble Navigation Ltd.), among others. Image database 110 also includes georeferenced data, vector data, and attributes that is/are associated with database images. The images are searchable by criteria such as image features, image attributes, camera location, feature descriptors, image features, object features, and/or image location, among other search criteria.

Image database management system 115 operates to access, manage, and maintain image database 110. Image database management system 115 receives inputs, queries, and the like to image database 110, processes received/selected images, and provides output and/or access to results of queries, processed images, and the like. Part of this management includes communicating with outside resources such as map repositories (e.g., maps 150); images to be processed (e.g., photos 155); georeferenced terrestrial image repositories/services such as Google Earth™ (by Google®), Virtual Earth™ (by Microsoft), TerraServer® (by TerraServer®), and the like (e.g., new image data structures 165); and government and commercial GIS information repositories (e.g., GIS locations 160). Georeference data points that encompass GIS locations 160 can be obtained from many sources to include: United States Geological Survey's (USGS) survey reference points and georeferenced images; selected reference points from city public works databases; and Continuously Operating Reference Stations (CORS). These CORS reference points are managed by the US Government under the National Geodetic Survey agency in the National Oceanographic and Atmospheric Administration, using GNSS receivers working with data from the GPS and GLONASS constellations.

Another part of this management includes accessing or allowing access of third party database software 170 which can assist in searching, organizing, or processing image information of image database. Yet another part of this management includes accessing or allowing access to two-dimensional and three-dimensional modeling tools 180 (e.g., software for rectifying images such as RolleiMetric MSR, software for photogrammetric multi-image evaluation such as RolleiMetric CDW, and other digital image manipulation and/or modeling software which may be available via communicative coupling to the Internet).

It is appreciated that, in various embodiments, image database management system 115 may reside at a data center or service facility run by an entity such as a company. In one such embodiment, a user remotely accesses database management system 115 or submits information and/or queries to an interface of image database management system 115. In another embodiment, image database management system 115 may be resident all or in part on a user's computer system (e.g., a personal computer, desktop computer, multi-media device, image capture device, or the like), thus allowing a user to access image database 110. In one such embodiment, a user's computer system may comprise a thin-client architecture allowing access to functions of image database management system 115 and image database 110 which are maintained elsewhere, such as in a datacenter. It is noted that in various embodiments, a user's computer system may comprise an integrated image capture device.

Feature selection processor 125 is a device and/or utility that allows a user to select or annotate a feature in a terrestrial image for which the user desires geolocation information. In one embodiment, annotating a feature in this manner, triggers system 100 to search for geolocation information to describe the annotated feature. In one embodiment, feature selection processor 125 is implemented using a display screen of a image capture device 120 to select, for example, a corner of a building in an image captured by camera 120. In one embodiment, feature selection processor 125 is implemented using a display computer 130 to select, for example, a corner of a building in an image captured by camera 120 or in an image stored in storage such as on a hard disk drive of display computer 130. In one embodiment, an image and the selected feature thereof, are communicated via communication device 135 (e.g., a wired or wireless communication device such as a wired/wireless modem/network interface and/or a cellular telephone) or via communicative coupling (similarly wired or wireless) from display computer 130 to image-based georeferencing system 100 for use in georeferencing or geolocation. It is appreciated that the communicated image may include geolocation information, provided by the user (e.g., a street address, zip code, latitude/longitude, or the like) or geolocation information that has been manually or automatically associated with the image via contemporaneous input from GNSS receiver 140, cellular telephone tower triangulation during capture of the image.

It is appreciated that, in one embodiment, geolocation information may be input automatically during capture of the image and may be stored or appended as part of the image file. Such geolocation information can include the location of camera 120 at time of image capture; date/time of image capture; the source of the geolocation information; an expected level of accuracy of the geolocation information (e.g., number of GNSS satellites in view, type of augmentation used with satellite information, and the like). This georeferenced information can come from a number of sources, including: GNSS receiver 140; Wireless Fidelity (WiFi) signals; GNSS augmentation signals (e.g. WAAS); and/or cellular towers, among others. In one embodiment, such geolocation information is included as a tag associated with the digital file of the image or included in the image file itself, such as in the header of the image file. In one embodiment, all or part of the geolocation information is included in EXIF (exchangeable image file format) location metadata tag of the digital image file of the image.

GNSS receiver 140 is a navigation system that makes use of a constellation of satellites orbiting the earth which provide signals to a receiver that estimates its position relative to the surface of the earth from those signals. Some examples of such satellite systems include the NAVSTAR Global Positioning System (GPS) deployed and maintained by the United States, the GLObal NAvigation Satellite System (GLONASS) deployed by the Soviet Union and maintained by the Russian Federation, and the GALILEO system currently being developed by the European Union (EU), and the Compass system of China. A GNSS receiver 140 may utilize signals from one or more satellite systems and may also utilize signals from other sources. It is appreciated that various enhancements to a GNSS receiver 140 may be employed to increase the positional accuracy of its position determinations. Some examples of enhancements include the Wide Area Augmentation System (WAAS), differential GPS (DGPS) and the like; and Real Time Kinematics (RTK).

It is appreciated that GNSS receivers, such as GNSS receiver 140, are utilized in a variety of applications besides their uses in surveying. As such, GNSS receivers 140 have become less inexpensive over time and fairly ubiquitous in modern society. Image capture devices 120, and in particular digital cameras, both still and video, are also fairly pervasive in modern society. It is appreciated that image capture devices 120 exist as stand alone devices and are also bundled into a wide variety of multimedia devices and/or mobile communication devices such as mobile telephones, computers (e.g., laptop computers, tablet computers, etc), and personal digital assistants. Additionally, some electronic devices bundle together GNSS receivers 140 along with image capture devices 120 and/or other electronic components.

Image Database Management System

Figure 2:
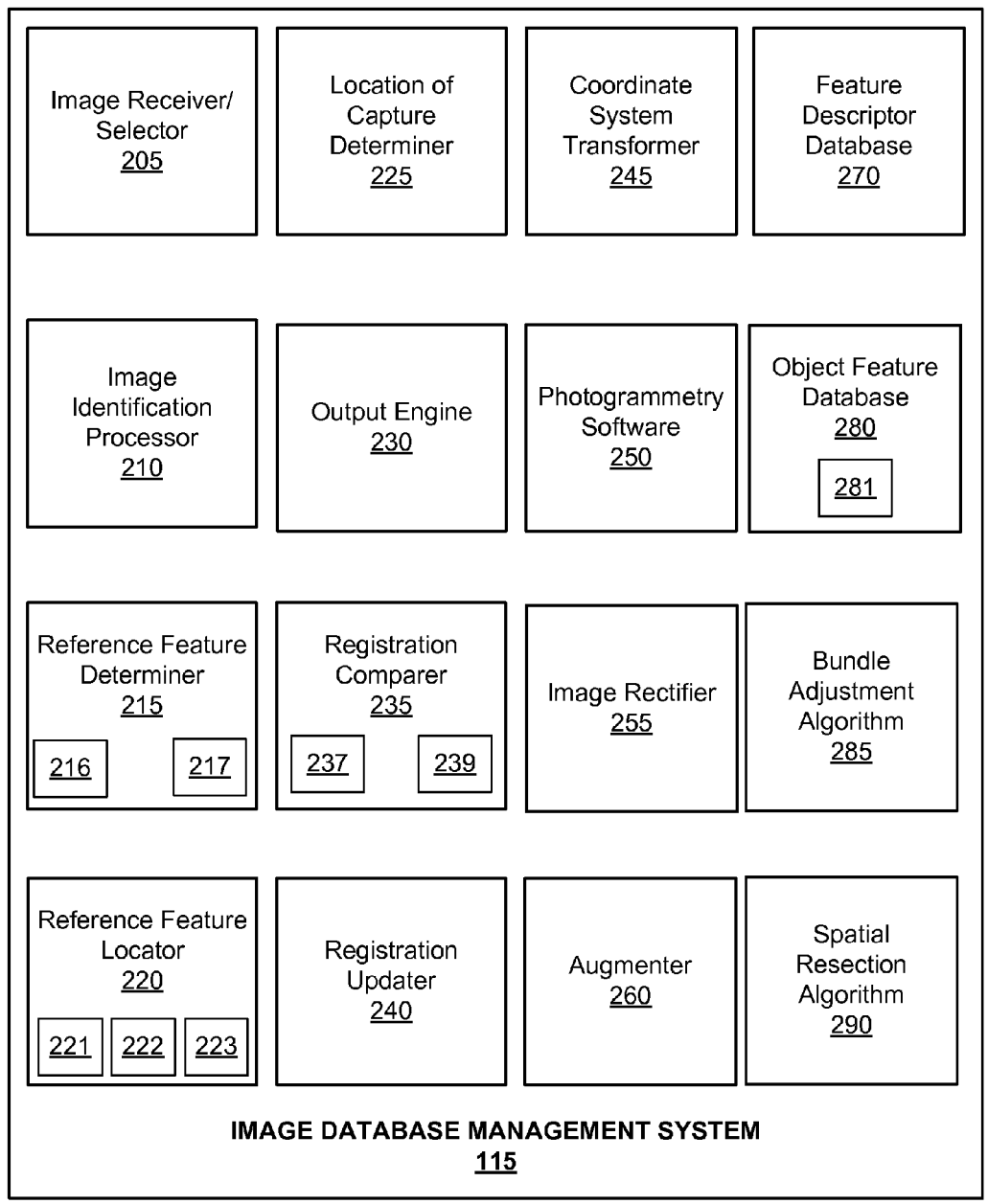
FIG. 2 is an example block diagram of an image database management system, in accordance with an embodiment.

FIG. 2 is an example block diagram of an image database management system 115, in accordance with an embodiment. As depicted, image database management system includes one or more of: image receiver/selector 205, image identification processor 210, reference feature determiner 215, feature locator 220, location of capture determiner 225, output engine 230, registration comparer 235, registration updater 240, coordinate system transformer 245, photogrammetry software 250, image rectifier 255, and augmenter 260. These components may be implemented in one or more of hardware, hardware and firmware, and hardware and software. As depicted in FIG. 1, image database management system 115 is, in one embodiment, a part of image database 110. In other embodiments image database management system 115 is a separate entity from image database 110 and is communicatively coupled with image database 110.

Image receiver/selector 205 operates to receive an image for processing/use in georeferencing (when sent from a remote user) or to allow a local user of image database management system 115 to select an image for processing/use in georeferencing, such as from photos 155 or another storage location. It is appreciated that the received/selected image is a digital file, which can include an image file captured by a digital camera or a digital scan of an analog (i.e., film-based) image.

Image identification processor 210, in one embodiment, operates to identify an image from image database 110 that correlates to the received/selected image being processed for georeferencing. Image identification processor 210 can identify the image from image database 110 based on location information, feature matching/image recognition, or other search criteria. For example, the identified image from image database 110 is, in one embodiment, an aerial image that encompasses or corresponds to a geolocation tagged in an image file of the received/selected image. In an embodiment where the received/selected image includes a user annotated point for which georeferenced information is desired, image identification processor 210 identifies an image that contains the annotated point from image database 110. In one embodiment, the annotated point is annotated (such as by circling, tagging, or the like) by the user via feature selection processor 125. It is appreciated that image identification processor 210 may be implemented as hardware, or a combination of hardware and firmware, or a combination of hardware and software such as an image recognition algorithm.

Reference feature determiner 215, in one embodiment, operates to determine a reference feature common to both the received/selected image and the image identified from image database 110. It is appreciated that a plurality of common reference features may also be determined. Pattern matching, corner detection, and other automated image correlating or matching techniques may be used to perform automated matches of reference features such as, for example, a building corner, that is common to both images. Alternatively, this matching can be done by the user, in one embodiment. In one embodiment, the reference feature is a feature that includes location data that is associated with the image identified from image database 110. Thus, for example, a matched building corner may be a surveyed, georeferenced location in the identified image from image database 110.

In accordance with various embodiments, reference feature determiner 215 further comprises a feature detector algorithm 216. Feature detection, or interest point detection, is a field of computer vision which identifies points of interest for further processing. For the purpose of the present application, the term "feature" is understood to be a point, region, contour, area of texture, or identifiable region of an image. In accordance with various embodiments, various types of features can be identified from an image generated by image capture device 120 depending upon the type(s) of feature detection algorithm(s) used. For example, edges, corners, blobs, or ridges can be identified as features. In accordance with various embodiments, feature detector algorithm 216 uses, but is not limited to, one or more implementations of the following edge detection algorithms; the Canny edge detection algorithm, the Canny-Deriche edge detection algorithm, the Differential Operator edge detection algorithm, the Sobel Operator edge detection algorithm, the Prewitt Operator edge detection algorithm, and the Poberts Cross Operator edge detection algorithm.

Furthermore, in accordance with various embodiments, feature detector algorithm 216 uses, but is not limited to, one or more implementations of the following corner detection algorithms: the Harris Operator corner detection algorithm, the Shi and Tomasi corner detection algorithm, the Smallest Univalue Segment Assimilating Nucleus (SUSAN) corner detection algorithm, the FAST corner detection algorithm, and the FAST Detector of the iPhone. Furthermore, in accordance with various embodiments, feature detector algorithm 216 uses, but is not limited to, one or more implementations of the following blob detection algorithms: the Laplacian of Gaussian (LoG) blob detection algorithm, the Difference of Gaussians (DoG) blob detection algorithm, the Determinant of Hessian (DoH) blob detection algorithm, the Maximally Stable Extremal Regions (MSER) blob detection algorithm, and the Principal Curvature-Based Region (PCBR blob detection algorithm. Furthermore, in accordance with various embodiments, feature detector algorithm 216 uses, but is not limited to, one or more implementations of the following Affine Invariant feature detection algorithms: the Affine shape adaptation feature detection algorithm, the Harris affine feature detection algorithm, the Hessian affine feature detection algorithm, and the Harris-Laplace feature detection algorithm. Many of the above listed algorithms are available from various sources. In accordance with various embodiments, the algorithms described above with reference to feature detector algorithm 216 are also resident upon image capture device 120.

In accordance with various embodiments, reference feature determiner 215 further comprises a feature descriptor extraction algorithm 217. In the image processing arts, features descriptors as defined as calculated (e.g., computed, extracted, etc.) identifiers of various aspects of the images of features. Feature descriptors are typically derived from groups of picture elements surrounding a feature, using feature detection and feature description algorithms that operate on a stored digital image. Feature descriptors are typically normalized to a reference in the original image and are usually intended to assist with the task of finding corresponding feature in pairs of images which could be taken of a given feature from different locations with different viewpoints. Thus, feature descriptors are often designed to be invariant to rotation, affine transformation, luminosity changes, or other imaging parameters. An advantage of scale-invariant metrics is that an object as captured in one image from a first vantage point can be found in another image which was taken from a different vantage point, even a slightly different vantage point. In accordance with various embodiments, feature descriptor extraction algorithm 217 resamples an area around a feature or point of interest of a captured image and derives a compact representation that can be used to identify the feature and distinguish it from other features in the image. The Scale-Invariant Feature Transform (SIFT) and the Speeded-Up Robust Feature (SURF) are two well-known algorithms for feature detection and description and matching. In accordance with various embodiments, feature descriptors are linked with a two-dimensional picture element (pixel) and the spatial coordinated of the pixel element is derived from a variety of photogrammetric methods, often involving multiple images of the same scene, all stored in image database 110. In accordance with various embodiments, feature descriptor extraction algorithm 217 uses, but is not limited to, one or more implementations of the following feature descriptor extraction algorithms: the Scale-Invariant Feature Transform (SIFT) feature descriptor extraction algorithm including the F-SIFT, PCA-SIFT, PSIFT variants, the Speeded-Up Robust Feature (SURF) feature descriptor extraction algorithm including the OpenSURF feature detector algorithm, the Gradient Location and Orientation (GLOH) feature descriptor extraction algorithm, the Histogram of Oriented Gradients (HOG) feature descriptor extraction algorithm, the Local Energy-based Shape Histogram feature descriptor extraction algorithm, a shape-context feature descriptor extraction algorithm, and Steerable Filters. In accordance with at least one embodiment, an affine-rectified feature detector algorithm is implemented by feature detector algorithm 216 while feature descriptor extraction algorithm 217 is implemented as a SIFT, or a shape-context, feature descriptor extraction algorithm. For the purpose of the present application, the term "image feature" is understood to comprise a representation of a two-dimensional pixel coordinate in an image and a corresponding feature descriptor. In accordance with various embodiments, feature descriptors of identified features are stored in feature descriptor database 270.

In an embodiment, where the reference feature is not already georeferenced in the identified image, reference feature locator 220 accesses a GIS to identify and obtain geographic location information related to the common reference feature. For example, this can be accomplished by accessing a surveyed map, a county or city GIS database, aerial database, a blueprint of a building, or the like. As the reference feature(s) is/are georeferenced, they serve as reference points for feature locator 220 to use in locating additional features in a field of view of the received/selected image. As will be described herein, the additional features in the received/selected image can be located by feature locator 220 via means such as interpolation, scaling, photogrammetry, triangulation and the like. In one embodiment a user-annotated point of interest/object of interest/feature of interest is located in this manner. Alternatively, feature detection algorithm 216 can be used to identify points of interest for further processing. In one embodiment, a feature matching algorithm 222 finds corresponding image features by comparing their respective feature descriptors. In one embodiment, if there are sufficient matches between a pair of images, then a close-range photogrammety algorithm is used to calculate the real-world located of each matched image feature. In one embodiment, object feature descriptor algorithm 223 is used to correlate the real-world coordinates of an identified feature with the corresponding feature descriptor for the identified feature. The resultant object features are stored in an object feature data storage system (e.g., object feature database 280 of FIG. 2) as feature descriptors with associated real-world coordinates. It is appreciated that via augmenter 260, the location point of a located feature can then be annotated on the received/selected image or otherwise augmented/associated with an annotated point in the received/selected image.

In one embodiment, feature locator 220 employs an accuracy validator 221 to check for and validate a level of accuracy associated with geographic location information accessed by feature locator 220. This provides a check of the inherent accuracy of the georeferenced position fix that feature locator 220 has retrieved for a determined reference feature. Accuracy validation can include validating the presence of vertical information in the georeferenced position fix. Such vertical information is referred to herein as Z-coordinate information.

In one embodiment, accuracy validation is accomplished to validate whether or not the accuracy of the positioning associated with the received/selected image may already be higher than the accuracy of georeferenced information that is otherwise obtainable from image database 110 or data sources communicatively coupled thereto. In one embodiment, accuracy validator 221 looks for an accuracy metric associated with the surveyed map, a county or city GIS database, aerial database, a blueprint of a building, or the like from which feature locator 220 retrieved the georeferenced position fix. If an accuracy metric is found, in one embodiment accuracy validator 221 notes the accuracy metric in a file associated with the selected/received image. In one embodiment, in absence of a metric, accuracy validator 221 attributes a validated accuracy to a georeferenced position fix based upon a known source of the position fix.

In one embodiment, for example, accuracy validator 221 validates a GPS RTK sourced position fix to have an accuracy of better than 5 cm, as GPS RTK measurements are typically accurate to 0.1-5 cm; validates a PPP (precise point positioning) sourced position fix to have an accuracy in the 5-10 cm range; validates a High-Precision GIS sourced position fix to have an accuracy in the 10-30 cm range; validates a Differentially Corrected GPS sourced position fix to have an accuracy in the 30 cm to 4 m range; and validates an uncorrected GPS-sourced position fix to have an accuracy in the 4-7 m range.

In one embodiment, reference feature locator 220 further comprises an object feature descriptor extraction algorithm 222. For the purpose of the present application, the term "object feature" refers to a feature descriptor of a feature from an image which is correlated to a spatial coordinates representing the feature's geographic location in the world. The spatial coordinates may be given in terms of a specialized and/or localized coordinate system, or may use a well-known world coordinate system such as the International Terrestrial Reference Frame (ITRF), WGS-84, North American Datum 1984, or the like. In accordance with various embodiments, object feature descriptor extraction algorithm 222 generates an object feature descriptor for each detected image feature from a given image.

In one embodiment, accuracy validation is accomplished to ensure that enough georeferenced information of accurate enough character is available for performing georeferencing of other points. For example, in one embodiment, if no Z-coordinate information is available from image database 110, this may trigger feature locator 220 to cause output engine 230 to send a real-time request to the supplier of a received image. In one embodiment, such a real-time message advises the image supplier to capture and supply another image from a different location of capture (for use in triangulation) or else to supply any available Z-coordinate information related to the received image or the location of capture of the received image. If this real-time message is received in a timely fashion, it can save an image supplier another trip to the field for additional data collection. In one embodiment, the absence or presence of information related to any validated accuracy of vertical, Z-coordinate information is provided to Z-coordinate accuracy estimator 239. This can be the absence or presence of vertical, Z-coordinate information related to the received/selected image. This can also be the absence or presence of vertical, Z-coordinate information related to a reference feature. This can also be the absence or presence of Z-coordinate information related to an image from image database 110.

Location of capture determiner 225, in one embodiment, operates to determine or refine a location of capture of the received/selected image. For example, by using geographic location information related to a common feature(s) between the identified image and the received/selected image is used to determine a georeferenced location of capture of the received/selected image. This is accomplished, in one embodiment, through triangulation. For example, in one embodiment, a previously unknown point in or relative to the selected/received image (e.g., the location of capture) can be triangulated from at least three non-collinear geolocated points from at least three respective reference features identified in the received/selected image.

In another embodiment, when a GNSS receiver 140 is utilized in conjunction with the capture of a received/selected image, the GNSS receiver denotes the location of capture of a received/selected image. In such an embodiment, location of capture determiner 225 uses a GNSS position relative to a camera 120 used for capturing the received/selected image to determine a location of capture of the received/selected image. The GNSS position relative to camera 120 can be utilized alone to determine the location of capture of the received/selected image. The GNSS position relative to camera 120 can also be used in conjunction with other more accurate georeferenced information (e.g., accessed from image database 110) to further refine the GNSS determined location of capture of the received/selected image.

In yet another embodiment, a camera 120 that is used to capture the received image is positioned such that its image plane is along the gravity vector above a surveyed mark and georeferenced information regarding the surveyed mark and height of camera above the surveyed mark are included with the selected/received image. Location of capture determiner 225 can use this georeferenced information alone to determine the location of capture of the received/selected image, or can use this georeferenced information in conjunction with other more accurate georeferenced information (e.g., accessed from image database 110) to further refine the survey determined location of capture of the received/selected image. In one embodiment, accuracy validator 221 determines the accuracy of georeferenced information, such as location of capture, that is supplied with a received/selected image to determine whether more accurate geolocation information exists that can be used to further refine the supplied location of capture.

Output engine 230, in one embodiment, provides georeferenced information derived and identified from the received/selected image as an output accessible by a user of system 100. Among other output actions, this can include electronically transmitting an augmented georeferenced version of the received/selected image back to the user, or to a location specified by the user (e.g., display computer 130), storing the georeferenced version of the received/selected image in image database 110 for future use by system 100, and/or allowing user access to a stored copy of the georeferenced image received/selected image. Through these and other mechanisms, output engine 230 pushes information to a user or to user selected location or makes such information available for user pull (such as download).

Registration comparer 235, in one embodiment, compares georeferenced registration information that is received in conjunction with a received/selected image to existing georeferenced registration information that is associated with an identified image to determine which is more accurate. In one embodiment, the level of accuracy is determined based upon comparing accuracy of sources used for determining the georeferenced information of the images being compared.

In one embodiment, registration comparer 235 includes a provenance checker 237 to determine a provenance of accuracy for a georeferenced position fix. The provenance of accuracy includes information such as the source of the georeferenced position fix and the level of accuracy associated with the source. Some examples of sources for a georeferenced position fix include, but are not limited to: GPS alone, GPS supplemented with WAAS, differential GPS, GPS-RTK, Google Earth™, TerraView; or surveyed coordinates. Provenance checker 237 can ascertain the source of a position fix from metadata, when available, that is associated with an image or a position fix. Similarly, accuracy information associated with the position fix source may also be included with the metadata associated with an image or a position fix (e.g., how many GPS satellites were in view and being used when a position fix was taken, expected centimeters of accuracy of a position fix, whether/what type of enhancement/augmentation was utilized with GNSS signals, and the like).

When accuracy data is not included with a position fix or an image, and/or cannot be determined by provenance checker 237, then registration comparer 235, in one embodiment, determines accuracy of a position fix through use of a lookup-type table or list that assigns default accuracies to position fix sources and/or establishes a hierarchy of accuracy from best to least for different types of position fix sources. Consider, as an example, a hierarchy of sources that specifies that GPS-RTK source information has a more accurate registration than Google Earth™ source information. In one embodiment, for example, a received image has registration information and position fixes that were determined using GPS-RTK. In a present day implementation, an image with such registration information and position fixes will be determined to be more accurate than an identified image that derived its registration information from Google Earth™, as GPS-RTK presently has more accurate position fixing than Google Earth™, which is sometimes off in registration by up to several meters. A hierarchical ranking or attributed accuracy may be altered over time. For example, as registration accuracy of Google Earth™ improves or degrades, its ranking in a hierarchy can be increased and decreased relative to other types of position fix sources, as is appropriate.

In one embodiment, registration comparer 235 includes a Z-coordinate accuracy estimator 239 to determine the accuracy of a vertical, Z-coordinate of a position fix associated with a point or reference feature in an image. It is appreciated that some images, such as aerial images, may not have any Z-coordinate or height associated with points, and thus do not have any Z-accuracy metric. A comparison of estimated Z-accuracies of like features in a pair of images can be used to determine which has better accuracy and which should be used for registration information in image database 110. It is appreciated that Z-coordinate accuracy estimator 239, in various embodiments, operates in conjunction with feature locator 220, accuracy validator 221, and/or location of capture determiner 225 to collect Z-coordinate information and accuracy information related thereto. In various embodiments, this can comprise z-coordinate accuracy estimator 239 collecting such information for a received/selected image or for a georeferenced position fix information accessed from image database 110 or a resource communicatively coupled thereto.

In one embodiment, for example, a candidate image is selected by or received by image selector/receiver 205. After image identification processor 210 identifies a second image that matches or correlates to the candidate image, and after reference feature determiner 215 determines objects/buildings and/or other reference feature(s) common to the candidate and identified image, feature locator 220 locates and retrieves geographic location information related to the common reference feature (e.g., a building corner). Registration comparer 235 looks for a position fix, like a latitude and longitude (and elevation), either in the aerial view, or elsewhere. In many cases, such a position fix has already been located by feature locator 220 and the accuracy of this position fix has already been vetted by accuracy validator 221.

Registration comparer 235 then compares a camera/GNSS location of capture accuracy (assuming availability) with the accuracy of a triangulated location of capture that has been determined by triangulating at least three non-collinear points accessed from image database 110, or a resource communicatively coupled thereto. Registration comparer 235 decides if the camera/GNSS position fix for the location of capture is more or less accurate than the triangulated fix. If so, registration updater 240 is employed to update any position fixes in the received/selected image by shifting the less accurate coordinates by a value that compensates for the difference between the less accurate and more accurate position. Registration updater 240 next checks to see if there are any other points in the field of view of the received/selected image that have better accuracy of position fix than the accuracy available for like points via access of image database 110 or resources communicatively coupled thereto. When a comparison determines that greater accuracy is available for a position fix of a point, information in image database 110 is updated by registration updater 240 in a similar manner by shifting the less accurate coordinates by a value that compensates for the difference between the less accurate and more accurate position.

When more than one new point is obtained during the course of gathering data with a camera and another method with defined accuracy judged or determined better than what is available from the image-based georeferenced data, an alternate adjustment can be made to the data in the database by registration comparer 235. The general approach to making such an adjustment is often done via the method of least squares. With multiple new control data points, the method is referred to as 'multiple regression least squares.' These techniques are well-known in the optimization arts. By one or more of these techniques, the adjustment to the original data points is made via a curve fitting process whereby the error differences between the new high accuracy data points and the points under adjustment are minimized, over the ensemble of all adjusted points. Weighting of the reference data points can enhance the value of the contribution of higher-accuracy newly-found points. Registration updater 240 (described below), then updates image database 110 with the adjusted data.

Registration updater 240, in one embodiment, updates existing geo-registration information with georeferenced registration information from a received/selected image if registration comparer 235 has determined that the geo-registration information for the received/selected image is more accurate than the geo-registration information for identified image. In one embodiment, when a GNSS/camera location of capture includes a Z-coordinate, when none is otherwise available, this Z-coordinate can be promulgated to other X-Y only position fixes by scaling, close range photogrammetry, or other methods described herein. In this manner, Z-coordinate information can be added to X-Y coordinate information for a feature (e.g., a building corner) available from an aerial view (e.g., an image from Google Earth™). It is also appreciated that if a more accurate Z-coordinate is available from a received/selected image, existing Z-coordinates from image database 110 can be adjusted to reflect improved Z-accuracy. In these manners, georeferenced content of image database 110 is refined when more accurate registration information becomes available.

Coordinate system transformer 245 operates, in one embodiment, to transform GIS information related to one or more common reference features or identified features into a desired coordinate system. This can be a local coordinate system, a coordinate system specified by a user, or a widely used coordinate system such as a global navigation satellite system coordinate system (e.g., ITRF, WGS-84, North American Datum 1984, or the like). Techniques for transforming coordinates from one coordinate system to another are well-known in the art.

Photogrammetry software 250, in one embodiment, comprises resident software in image database management system 115 or software accessible by image database management system 115. Photogrammetry software is used, in one embodiment, for camera calibration (i.e., precise determination of focal length, field of view, image principal point, optical axis, as well as the ability to correct for optical distortions) of a camera 120 used in capturing a received/selected image. In other embodiments, photogrammetry software is used to adjust image perspective (i.e., to rectify an image) and/or to assist in geolocating items in the fields of view of at least two images. Several photogrammetry software suites are available commercially, e.g., PhotoModeler, iWitness, Topcon's ImageMaster, RolleiMetric's CDW and CDW Graphics and may, by way of example and not of limitation, be utilized as photogrammetry software 250.

Image rectifier 255 "rectifies" or adjusts the perspective of non-perpendicular images to provide precise vertical and horizontal reference features. Image rectifier 255 has the ability to rectify a flat, or nearly flat, region in the image, for example a building façade. This rectification is typically performed by rotating the image content about a vertical axis until lines such as the top edges of buildings, doors, and windows, become perpendicular to the vertical axis in the portion of the image of interest, such as a vertical building edge. It is appreciated that techniques for such rectification are well known in the fields of digital image manipulation. Photorectification can be done for horizontal surfaces, such as a street, by the same methods. In accordance with embodiments of the present invention, image rectification can be executed so that the vertical and horizontal scales are the same such that features in a rectified imaged can be geolocated by scaling from known distances between common points that are supplied from a georeferenced image identified from image database 110.

Augmenter 260 augments location information on or in association with the received/selected image. This location information can include geographic location information regarding common reference information between the received/selected image and the identified image. In this manner a georeferenced image is created from the received/selected image. The annotated georeferenced image, annotated metadata tags, or associated annotation file can then be stored in image database 110 or other storage, and/or output to a user or provided for user access. In an embodiment where augmenter 260 marks up the received/selected image, annotation marks are indicative of identified reference points and other identified features. The annotation marks, when made, may comprise information such as coordinates of a coordinate system being placed in or associated with points in the georeferenced image. It is appreciated that the annotations may be made in a coordinate system that to which the identified image is georeferenced. Likewise, the annotations may be made in another coordinate system (such as a coordinate system requested by a user) by using coordinate system transformer 245 to transform coordinates to a desired coordinate system prior to making annotations.

Figure 3:
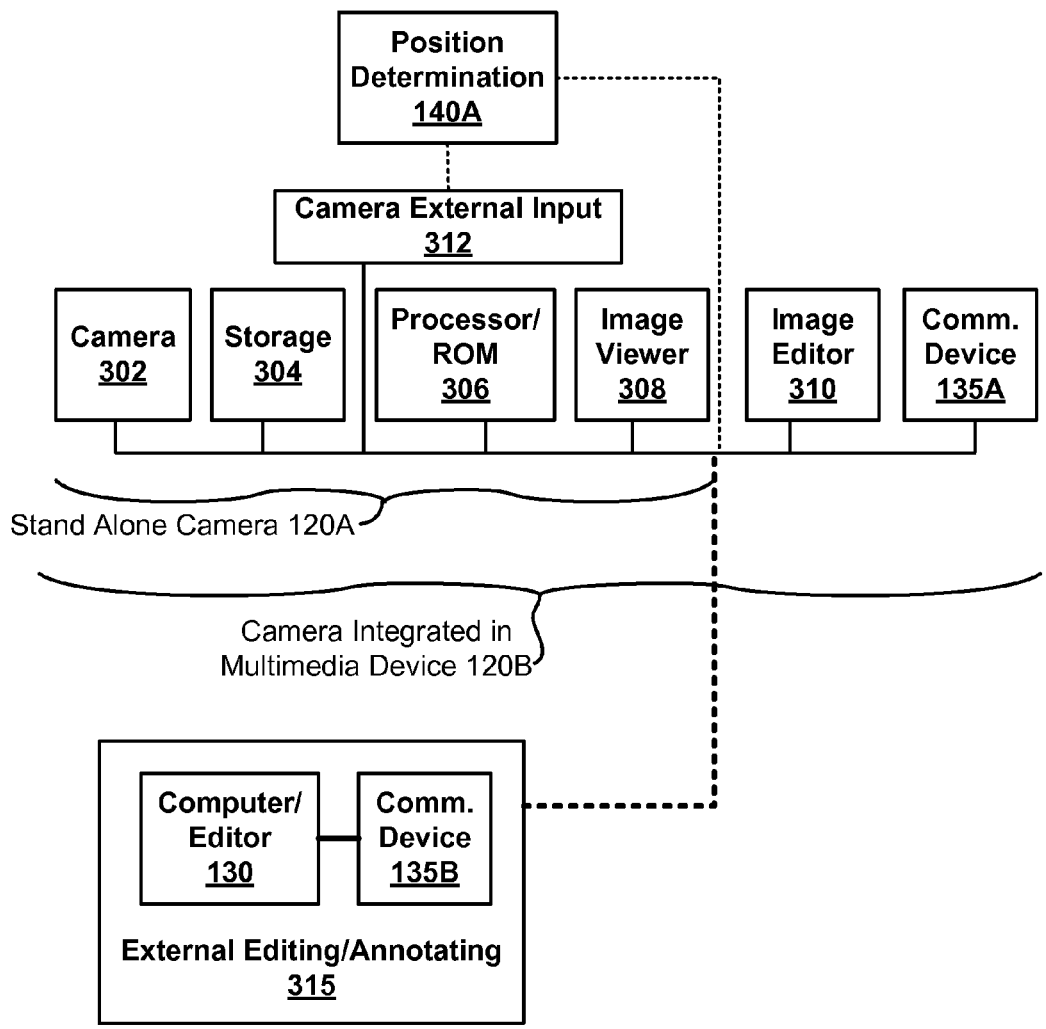
FIG. 3 is an example block diagram of a digital camera, in accordance with various embodiments.

FIG. 3 is an example block diagram of an image capture device 120, in accordance with various embodiments. As illustrated in FIG. 3, in one embodiment, image capture device 120 comprises a stand alone camera 120A includes a camera 302 for image capture (e.g., a lens and image sensor), storage 304 (e.g., random access memory); processor and read only memory 306; image viewer 308 (e.g., a liquid crystal display); and external input 312 (e.g., a serial or other bus). As illustrated, in one embodiment a position determination component 140A (e.g., a GNSS receiver/antenna) is coupled to the camera external input 312 of a stand alone camera 120A and/or multimedia device 120B, provided as an integrated component of a stand alone camera 120A, and/or integrated along with the camera in a multimedia device 120B. In one embodiment, an image editor 310 and a communication device 135A (e.g. a wired/wireless modem or network interface) is/are built in to a multimedia device 120B that includes a image capture device. An example of an image capture device 120 included in a multimedia device 120B includes a cellular phone or personal digital assistant that includes a digital camera. In one embodiment, external image editing/annotating 315 is available, such as on display computer 130 which is communicatively coupled with camera 120A/120B via a wired or wireless communication device 135B.

For high geolocation accuracy, a suggested camera is an advanced amateur system with high resolution with 6 to 24 or more megapixels, preferably with fixed focus. The camera/lens system should be mechanically rigid under reasonable environmental conditions and handling conditions. In one embodiment, the camera will have a port to receive precise GPS location information and record this in EXIF registers, but this is not required. Specialized higher-end, more accurate cameras than these can be used, or a very simple portable digital camera such as a cellular phone camera will be useful as well. It is noted that various components of image database management system 115 can be operated upon image capture device 120. For example, image capture device 120 is configured to utilize feature detection algorithm 216, feature descriptor extraction algorithm 217, feature matching algorithm 222, and/or object feature descriptor algorithm 223 in one or more embodiments. In one embodiment, the same algorithm, or a functionally similar algorithm, of feature detection algorithm 216 used by image database management system 115 is also utilized by image capture device 120. Similarly, the same algorithm, or a functionally similar algorithm, of feature descriptor extraction algorithm 217, feature matching algorithm 222, and/or object feature descriptor algorithm 223 used by image database management system 115 is also utilized by image capture device 120.

Figure 4A:
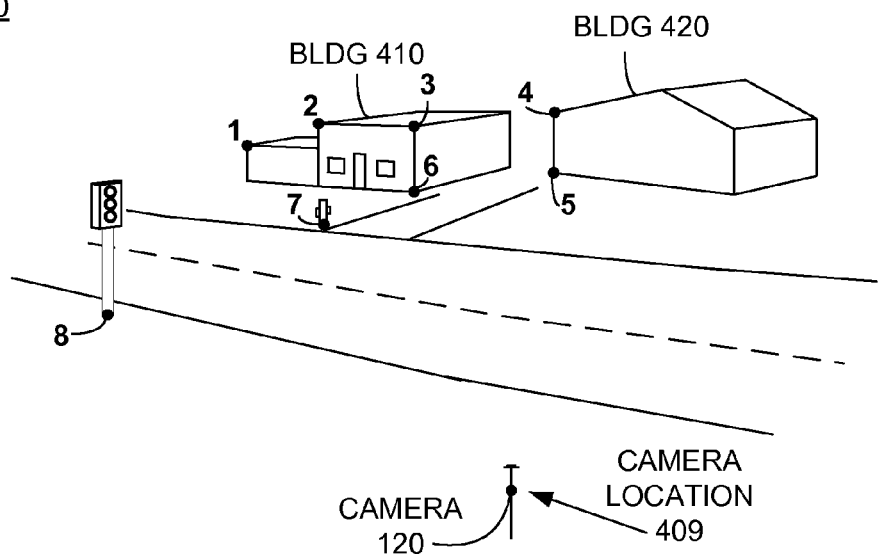
FIG. 4A is perspective view of a terrestrial scene, according to an embodiment.

FIG. 4A is perspective view 400 of a terrestrial scene, according to an embodiment. Perspective view 400 includes a building 410, a building 420 and several points of interest (1-8) that have been annotated for purpose of example. Camera location 409 denoted a location of camera 120 at the time of capture of image 405 (FIG. 4B, 4C).

Figure 4B:
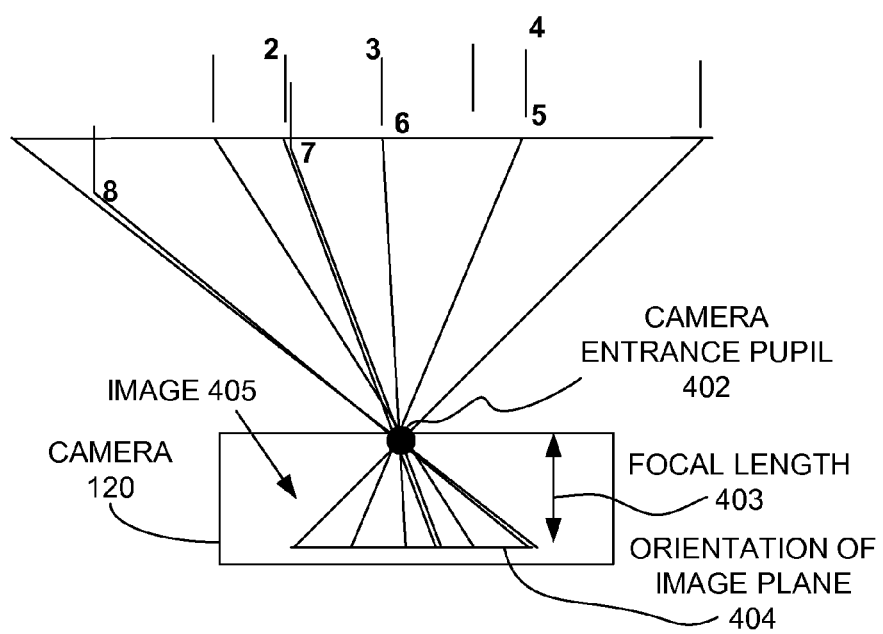
FIG. 4B is an example diagram of a camera taking an image of the terrestrial scene of FIG. 4A, according to an embodiment.

FIG. 4B is an example diagram of a camera 120 taking an image 405 of the terrestrial scene of FIG. 4A, according to an embodiment. For purpose of example, points of interest 1-8 are noted as being captured on the image plane 404. The internal workings of camera 120 are illustrated, including camera entrance pupil/lens 402, focal length 403, and image plane 404. It is appreciated that these internal workings can be calibrated via photogrammetry software 250 to correct for some optical distortions of image 405. In one embodiment, image 405 is provided by a user to system 100 for georeferencing. Then, known photogrammetry techniques can be used to determine the angles from the camera to the reference points as in FIG. 4B, and with this information, a user may locate the position of the entrance pupil of the imager/camera.

Figure 4C:
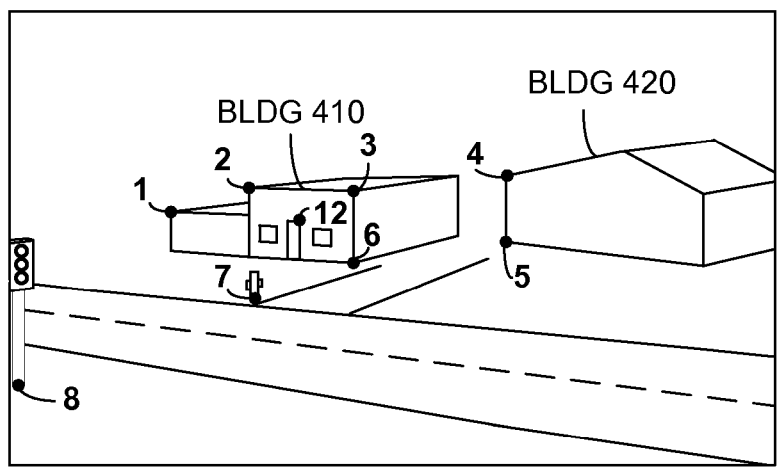
FIG. 4C is an image of the terrestrial scene of FIG. 4A, according to an embodiment.

FIG. 4C represents an image 405 of the terrestrial scene of FIG. 4A that has been captured by camera 120, according to an embodiment. Again, for purposes of example, points 1-8 are annotated. It is appreciated that one or more of points of interest can be user-annotated. For example, in one embodiment, a user may utilize feature selection processor 125 to annotate one or more points, such as point 6, for which georeferencing information is desired. Likewise, some of these points may be automatically annotated or selected for georeferencing by corner/edge sensing software of feature selection processor 125, reference feature determiner 215, and/or photogrammetry software 250. It is appreciated that in one embodiment, geographic location information regarding camera location 409 is accessed by camera 120 from a GNSS receiver 140 and automatically tagged into the metadata of the image file of image 405. In another embodiment, a user may manually provide similar information by manually tagging image 405 with location information such as the street address of building 410, or known survey point.

Figure 4D:
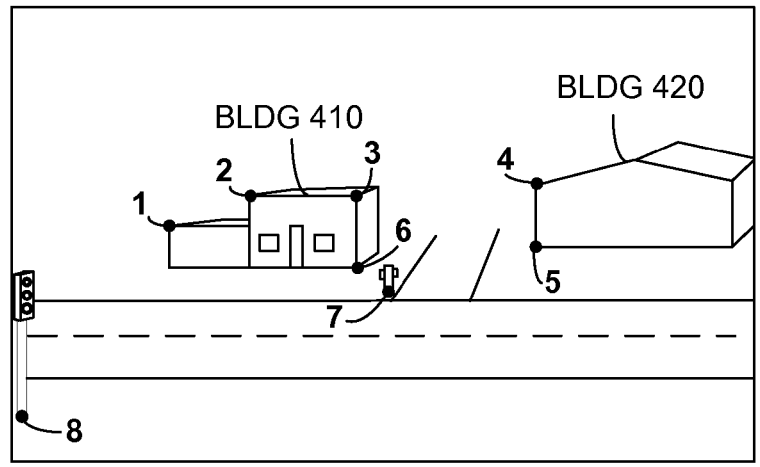
FIG. 4D is perspective adjusted image produced from the terrestrial scene image of FIG. 4C, according to an embodiment.

FIG. 4D is perspective-adjusted image 405' produced from the terrestrial scene image 405 of FIG. 4C, according to an embodiment. In one embodiment, this perspective adjustment is accomplished in image database management system 115 by image rectifier 255 rectifying image 405. This perspective-adjusted portion of image 405' facilitates scaling and distance interpolation from a georeferenced aerial (plan view) image that includes common features to those of image 405.

Figure 4E:
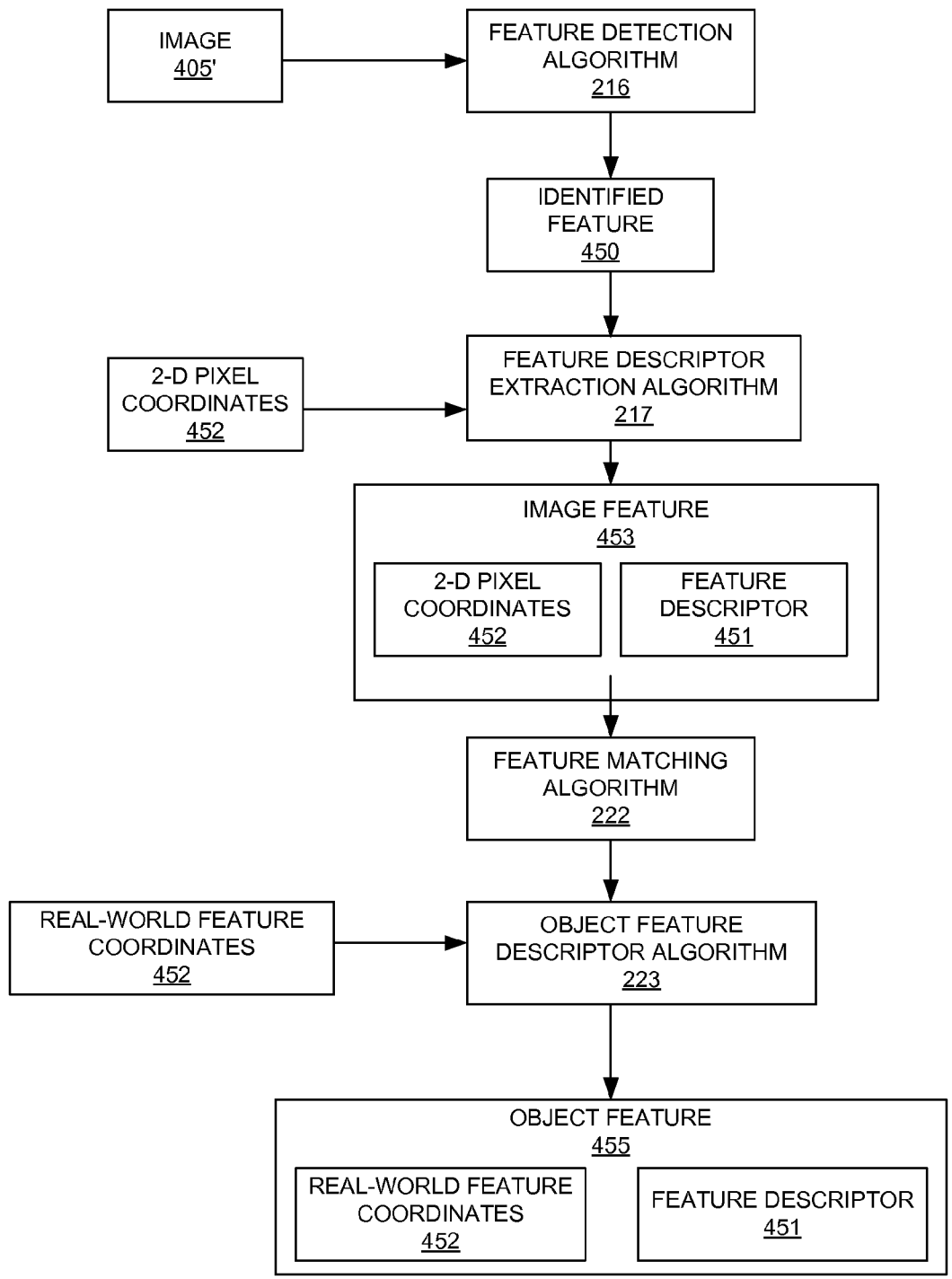
FIG. 4E shows a sequence of data objects which are generated by image database management system 115 in accordance with various embodiments.

FIG. 4E shows a sequence of data objects which are generated by image database management system 115 in accordance with various embodiments. Referring again to image 405 of FIG. 4C, in one or more embodiments, image 405 is processed by feature detection algorithm 216 which identifies and outputs an identified feature 450. Identified feature 450 is then input to feature descriptor extraction algorithm 217 which generates a feature descriptor 451. For example, feature detection algorithm 216 will identify point 2 of image 405 as a feature for future processing. When combined with a two-dimensional (2-D) pixel coordinate of point 2 (e.g., 452 of FIG. 4E) from image 405, an image feature 453 is created. As described above, feature matching algorithm 222 is used to find corresponding image features by comparing their respective feature descriptors. When a match between features from different images are found, object feature descriptor algorithm 223 is used to generate object features (e.g., 455) which correlate the real-world feature coordinates (e.g., 454) of identified feature 450 (e.g., point 2 of FIG. 4C) with the feature descriptor 451 for that feature. As described above, object features 455 are stored in a object feature database 280 in one or more embodiments. In accordance with at least one embodiment, once image features 453 and object features 455 have been generated, it is not necessary to retain the images (e.g., 405 of FIG. 4C) from which they were derived. In one embodiment, the images from which image features 453 and object features 455 were derived (e.g., 405 of FIG. 4C) it can be deleted, or stored in offline storage (not shown). Retention of image 405 would enable image features 453 and object features 455 to be recreated if desired. Alternatively, alternate image features and object features could be generated using different descriptor and/or matching algorithms.

Example Computer System Environment

Figure 5:
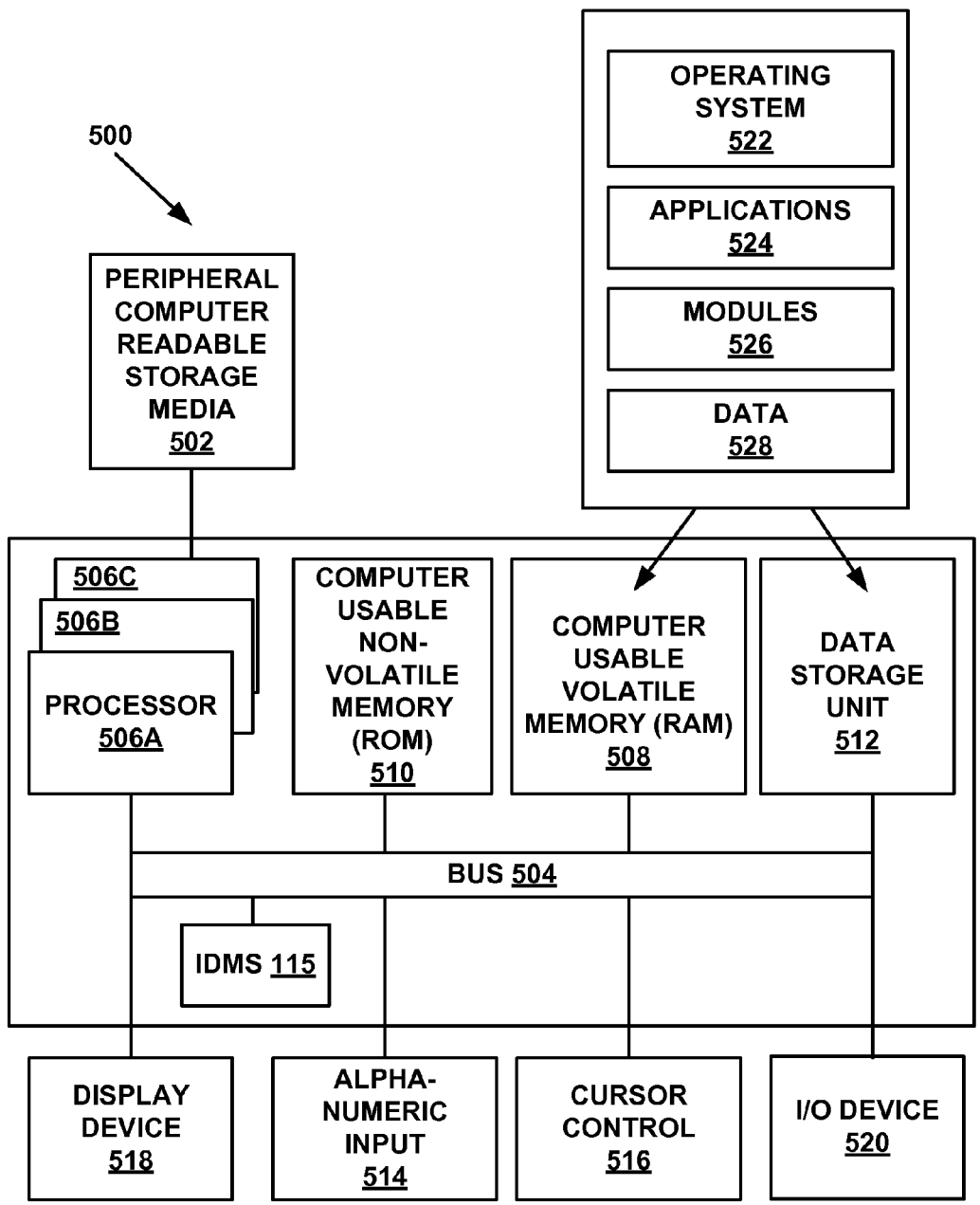
FIG. 5 is a block diagram of an example computer system with which, or upon which, various embodiments of the present invention may be implemented.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 500) that can be used in accordance with or to implement various embodiments which are discussed herein. It is appreciated that computer system 500 of FIG. 5 is only an example and that embodiments as described herein can operate on or within a number of different computer systems including, but not limited to, general purpose networked computer systems, embedded computer systems, server devices, client devices, stand alone computer systems, mobile communication devices, media centers, handheld computer systems, multimedia devices, databases, database management systems, and the like. Computer system 500 of FIG. 5 is well adapted to having peripheral computer-readable storage media 502 such as, for example, a floppy disk, a compact disc, digital versatile disc, universal serial bus "flash" drive, removable memory card, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C. System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alphanumeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. In one embodiment, system 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alphanumeric characters recognizable to a user. Optional cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508 (e.g., RAM), computer usable non-volatile memory 510 (e.g., ROM), and data storage unit 512. In some embodiments, all or portions of various embodiments described herein are stored, for example, as an application 524 and/or module 526 in memory locations within RAM 508, computer-readable storage media within data storage unit 512, peripheral computer-readable storage media 502, and/or other tangible computer readable storage media.

As shown, in one embodiment, image database management system (IDMS) 115 is coupled with bus 504 as a portion of computer system 500 and controls actions of a processor 506 and/or other portions of computer system 500. It is appreciated that, in some embodiments, a portion of image database management system 115 exists as an application 524 and/or module 526 in computer-readable storage media (e.g., RAM 508, data storage unit 512, peripheral computer readable storage media 502, or the like) that is a part of or is accessible by computer system 500. It is also appreciated that, in some embodiments, a portion of image database 110 exists as data 528 and or an application 524 in computer readable storage media (e.g., RAM 508, data storage unit 512, peripheral computer readable storage media 502, or the like) that is a part of or is accessible by computer system 500.

Location of Image Capture Device and Object Features in a Captured Image

Figure 6:
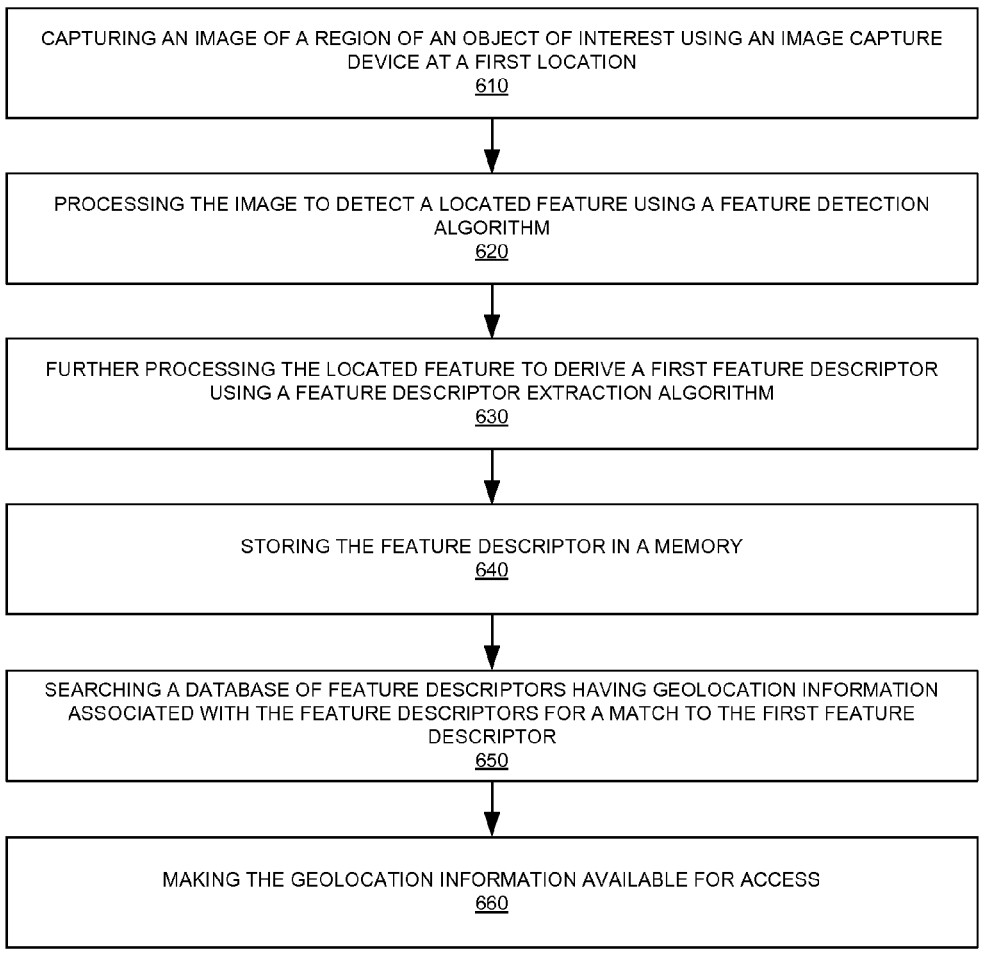
FIG. 6 is a flowchart of a method for matching a region on an object of interest with a geolocation in a coordinate system in accordance with various embodiments.

FIG. 6 is a flowchart of a method 600 for matching a region on an object of interest with a geolocation in a coordinate system in accordance with various embodiments. In operation 610 of FIG. 6, an image of a region of an objet of interest is captured using an image capture device at a first location. As an example, image 405 of FIG. 4C can be captured by image capture device 120.

In operation 620 of FIG. 6, the image is processed to detect a located feature using a feature detection algorithm. As described above, a feature detection algorithm (e.g., 216 of FIG. 2) can be used to detect features, regions, or points of interest from an image. As described above, feature detection algorithm 216 can be used to detect features of interest such as point 2 of FIG. 4C from image 405. In one embodiment, feature detection algorithm 216 is operated by image capture device 120 to generate identified features 450.

In operation 630 of FIG. 6, further processing of the located feature is performed to derive a first feature descriptor using a feature descriptor extraction algorithm. As described above with reference to FIG. 4E, identified features 450 are further processed by feature descriptor extraction algorithm 217 to generate feature descriptors 451. Additionally, the same feature descriptor extraction algorithm operated upon image capture device 120 is used by image database management system 115 to generate feature descriptors 451.

In operation 640 of FIG. 6, the feature descriptor is stored in a memory. In one embodiment, feature descriptor 451 is stored in a memory of image capture device 120 and/or image database 110 (e.g., RAM 508 of FIG. 5). In accordance with one embodiment, the first feature descriptor is sent from an image capture device (e.g., 120) to image database management system 115. In accordance with various embodiments, image capture device 120 can utilize a locally implemented feature detection algorithm 216 and feature descriptor extraction algorithm to generate an image feature 453 which can be sent to image database management system 115. This data can also be retained at image capture device 120 for future use.

In operation 650 of FIG. 6, a database of feature descriptors having geolocation information associated with the feature descriptors is searched for a match to the first feature descriptor. As described above, in one embodiment object feature database 280 stores object features 455 comprising a feature descriptor 451 of identified feature 450 as well as a corresponding set of real-world feature coordinates 452 for identified feature 450. Thus, when the feature descriptor 451 of an object feature 455 stored in object feature database 280 matches the feature descriptor 451 of an identified feature 450 from an image (e.g., 405 of FIG. 4C), image database management system 115 returns a match.

In operation 660 of FIG. 6, the geolocation information is made available for access. In one or more embodiments, image database management system 115 can determine the geographic position and orientation of image capture device 120 based upon the image feature 453 which it received. In one embodiment, image database management system 115 sends the geographic position and orientation data back to image capture device 120. This facilitates determining the geographic position of image capture device 120 with greater precision than is often possible based upon cell tower triangulation or embedded GNSS devices. In another embodiment, rather than sending the geographic position and orientation data to image capture device 120, image database management system 115 sends an object feature 455 to image capture device 120. As discussed above, image database management system 115 searches object feature database 280 to find object features 455 which match the image feature 453 sent by image capture device 120 based upon a match of the corresponding feature descriptors 451. In one embodiment, image database management system 115 then sends the object feature 455 having the matching feature descriptor 453 back to image capture device 120 where the object feature 455 is stored thereon. Image capture device 120 then determines its own geographic location and orientation.

In accordance with various embodiments, image capture device 120 can also send an estimated location and/or orientation to image database management system 115. The estimated location can be based upon data from an embedded GNSS receiver of image capture device 120, or based upon cell tower triangulation (e.g., based upon signal strength, or time of flight data from nearby cell towers). Additionally, recognized landmarks such as street signs or other features may be conveyed to image database management system 115. This location data assists image database management system 115 to narrow the parameters of the search of object feature database to object features 455 which are proximate to, or within the field of view of, image capture device 120 and to thus identify a subset of the object features stored in object feature database to search for a match with the feature descriptor 451 send by image capture device 120. The field of view of image capture device 120 can often be determined from Exchangeable Image File Format (EXIF) metadata in the image file, or from prior knowledge of the camera type used by image capture device 120. Image capture device 120 thus sends a request to image database management system 115 for a set of object features 455 which are like to be visible to image capture device 120 based upon the estimated location and/or orientation of image capture device 120. In one embodiment, image database management system 115 determines the geographic position and orientation of image capture device 120 and send that data to image capture device 120. Alternatively, image database management system 115 can send the matching object features 455 to image capture device 120. It is noted that in at least one embodiment, image capture device 120 sends the estimated location and/or orientation data to image database management system 115 along with a captured image 405. Image database management system uses this information to narrow the search parameters of object feature database 280 and then generates the feature descriptor(s) 451 used to further refine generating the geographic position and/or orientation of image capture device 120. Again, image database management system 115 can send the geographic position and/or orientation data back to image capture device 120, or send one or more object features 455 to image capture device 120 which in turn determines its own geographic position and/or orientation. Alternatively, image capture device 120 can generate the feature descriptor(s) 451 used by image database management system to derive the geographic position and/or orientation of image capture device 120. In accordance with various embodiments, an identical, or similar feature descriptor extraction algorithm 217 is used both by image capture device 120 and image database management system 115 for processing of survey images and images captured by image capture device 120. This results in compatible descriptors so that feature matching algorithm 222 can compare them and correctly identify correspondences.

Finding a Match Between Feature Descriptors

Searching for matches of like or similar data sets is well-known in the computer arts. There are many suitable strategies for finding a match between feature descriptors. In an embodiment, the a first strategy is to simply search the entire database for a match to one or more feature descriptors. In another embodiment, the search of feature descriptors is constrained to a collection of feature descriptors whose spatial coordinates are within a specified distance (range) from an estimated or approximate location of the image captured by image capture device 120. In another embodiment, there are additional aiding methods which may include taking account of the known 3D spatial geometry of the object features.

The following sections describe the steps for performing the various example operations performed in accordance with various embodiments.

Creating a Feature Descriptor and Spatial Coordinate Database

In an embodiment, the following preparatory steps are performed. A series of images are capture from which feature descriptors are generated, and 3D world locations for selected sets of image features are calculated. As described above, in one embodiment most of these steps are performed at a server (e.g., image database 110) and not in the field by image capture device 120. Thus, image capture device 120 is not typically the data source for populating the objects features database 280.

In one embodiment, a first data collection activity is performed, where a series of first images are collected from a series of locations, and where the locations of the camera and/or some identifiable points in the image are accurately measured. Methods for determining the geographic position(s) of these identifiable points is described above. These first images and the associated locations are stored in a data storage system such as image database 110. For example, a vehicle-based survey by Trimble's Trident-3D product or Google's StreetView product can be performed. When taken via a traveling capture device, multiple images from successive locations can be used to do photogrammetry for location determination. For each image, feature detection algorithm 216 identifies a set of features and feature descriptor extraction algorithm 217 then determines a set of feature descriptors 451 with associated 2D pixel coordinates 452. The result is a set of image features 453 for each image, which are stored in a second data storage system.

For pairs of nearby (sequentially captured and spaced apart by some separation distance, i.e., neighboring) images, feature matching algorithm 222 finds corresponding image features 453 by comparing their feature descriptors 451. Typically, each different feature description and matching method includes data structures and methods to optimize operation. For example, tree-based data structures are often used (e.g., SIFT uses a modified k-dimensional (k-d) tree). In one embodiment, these data structures are included in image database management system 115 along with the feature descriptors and coordinates. In one embodiment, if there are sufficient matches for a pair of images, then a close-range photogrammetry algorithm is used to calculate the real-world location of each matched image feature 453. The resultant object features 455 are stored in an object feature database 280 as feature descriptors 451 with associated real-world feature coordinates 454.

After the step of generating the image features and object features from the first series of images, it is not necessary to retain those first images. Optionally they could be retained, perhaps in offline storage. Retention would enable the image features and object features to be recreated if desired, which could be useful if improved descriptor and matching algorithms become available in future.

Finding the Location of an Image Capture Device at a Remote Server from Local Feature Descriptors Determined by the Image Capture Device When no information about the location of the image capture device 120 is available, in some embodiments, the location and orientation of the ICD may be determined by image database management system 115. As described above, image capture device 120 captures an image 405. A feature detection algorithm 216 and feature descriptor extraction algorithm 217 resident upon image capture device 120 identifies a set of image features 453 in image 405, consisting of their feature descriptors 451 and 2D pixel coordinates 452. Again, it is beneficial, although not absolutely necessary that the feature detection algorithm 216 and feature descriptor extraction algorithm 217 used by image capture device 120 is either the same or functionally similar to the feature detection algorithm 216 and feature descriptor extraction algorithm 217 used by image database management system 115 in the preparatory phase during generation of the object feature database 280 as described above.

In one embodiment, a subset of the object features 455 are optionally identified, as the result of a spatial search for object features 455 that are likely to be visible to the camera of image capture device 120. This reduces the set of input data searched by feature matching algorithm 222. The spatial search relies on the approximate location and/or orientation of the camera 302 of image capture device 120, which is sometimes but not always known.

Feature matching algorithm 222 finds corresponding features by comparing the feature descriptors 451 in the image features 453 sent by image capture device 120 with the feature descriptors 451 in the subset of the object features 455.

If sufficient matches are found between the feature descriptors 451 sent by image capture device 120 and the feature descriptors 451 stored by image database management system 115, the matching image features 453 from image capture device 120 and object features 455 are processed by a spatial resection algorithm 290 by image database management system 115, which calculates the real-world geographic position and orientation of image capture device 120 to a high degree of accuracy. This method is advantageous in that rather than sending an entire image which may comprise millions of bytes of data, image capture device 120 can send an image feature 453 which may only comprise a few kilobytes of data.

Finding ICD Location More Precisely when Approximate Location is Known, Determining Local Feature Descriptors, and Performing Matching at the ICD In one embodiment, when image capture device can estimate its approximate position and orientation; it can request a set of object features 455 from image database management system 115 comprising 3D locations likely to be visible from the approximate location of image capture device 120. When retrieving a suitable object feature dataset from image database management system 115, it is not necessary to have the approximate location and orientation of image capture device 120, or the field of view its camera 302, as described above, but it will speed up any matching operation being performed. Some approximation of the location of image capture device 120 is often available from cellular station triangulation and/or GPS, and orientation is often available from an embedded compass and accelerometers disposed within image capture device 120. As discussed above, the field of view of camera 302 can often be determined from Exchangeable Image File Format (EXIF) metadata in the image file, or from prior knowledge of the camera type. If these values are available to image database management system 115, they can be used to optimize the correspondence search. The values define a spatial region within which lie the relevant object features 455 to be sent to image capture device 120. Only those object features 455 need to be considered during the feature matching process. This could be implemented by a spatial index to the object feature database 280, or by an object feature locating algorithm 281 resident upon image database management system 115. As an example, object features 455 have a known spatial geometry, which could be exploited by object feature locating algorithm 281 to optimize the correspondence search. This spatial search may identify object features within a certain radius of the approximate location of image capture device 120, and/or image features within the expected field of view from camera 302, and/or a visibility filter could be applied. A visibility filter may remove object features 455 if they cannot be visible from a given location, for example if they are occluded from image capture device 120 by a large building. In one embodiment, a visibility filter utilizes a model such as a 3-D city-wide building model.

In other words, image capture device 120 acquires an image 405 of a scene of interest, performs a feature identification and feature descriptor analysis functions locally and stores the resulting feature descriptors 451 locally. Image capture device 120 then sends a request to image database management system 115 for retrieval of a set of object features 455 whose 3D coordinates are likely to be visible from image capture device 120. Image capture device 120 receives and stores a subset of the object features 455 stored in object feature database 280, and performs a search locally to find matching feature descriptors 451 between those generated and stored locally and those comprising the received object features 455 from image database management system 115. In one embodiment, once a sufficient number of matches (e.g., seven matches) are found between the locally generated feature descriptors 451 and those conveyed in object features 455 received from image database management system 115, image capture device 120 can determine its geographic position and orientation more precisely via standard photogrammetry methods.

Finding ICD Location More Precisely when Approximate Location is Known, Determining Local Feature Descriptors, and Performing Matching at the Server In one embodiment, the user captures an image 405 with image capture device 102 and activates feature detection algorithm 216 and feature descriptor extraction algorithm 217. The resultant data (e.g., image feature 453) is stored locally, along with an estimate of the geographic position of image capture device 120. Image capture device 120 sends the feature descriptor data (e.g., image feature 453, or feature descriptor 451 alone) and the approximate geographic position to image database management system 115 for processing. At the image database management system 115, a search function localizes its searching to object feature data that is likely to be visible from the approximate geographic position of image capture device 120. Image database management system 115 searches this data set for a match between the feature descriptor 451 sent by image capture device 120 and a corresponding feature descriptor 451 comprising at least one object feature 455 stored in object feature database 280. When a sufficient number of matches are found, image database management system 115 then calculates the geographic position, and possibly the orientation, of image capture device 120. Image database management system 115 then sends the geographic position and orientation data back to the image capture device 120 for use by the user.

Finding ICD Location More Precisely when ICD Contains the Object Features Database In embodiment, relevant portions of object features database 280 are downloaded to image capture device 120, either in advance of its use (in the field), or via a wireless link. A relevant portion may include a large part of a city, for example, or all of the city's data in object features database 280. In this case, image capture device 120 performs all the steps necessary to capture and identify features and create feature descriptors 451. These feature descriptors 451 along with their 2-D pixel coordinates 452 are stored locally. Then image capture device 120 performs a search for a match between the locally generated feature descriptors 451 and those downloaded from the relevant portion of the main object features database 280. Once found, the geographic position and orientation of image capture device 120 may be determined from standard photogrammetric methods.

Determination of Location of Arbitrarily Chosen Points in an Image

The operations described above result in the calculation of the geographic position and orientation of image capture device 120. However, sometimes a user is interested in the location of a particular feature in the scene, which we will call a target region of interest for which real-world coordinates are not stored by image database management system 115. In one embodiment, a user can indicate the target region by choosing a pixel in the image, using a crosshair, clicking a mouse, or tapping on a touchscreen as described above with reference to feature selection processor 125. The operations described above find a number of matching identified features (e.g., 450) and calculate the real world feature coordinates 454 of each one. It is possible that one of these matching identified features 450 is close enough to the target region so that the user is satisfied. But it is more likely that the matching identified features 450 are sparse and do not coincide with the target region. In this case two techniques can be used to calculate the geolocation of the target region. One technique can be used with object features in a coverage area and the other technique can be used with object features out of a coverage area.

In one embodiment, it is assumed that that the target region is on a planar surface surrounded by object features 455, as shown in FIG. 4C. In FIG. 4C, a target region 12 is located on a planar surface of building 410 and is surrounded by object features (e.g., points 2, 3, and 6 of building 410). In one embodiment, object feature locating algorithm 281 finds a set of object features (e.g., object features 455 corresponding respectively to points 2, 3, and 6) located on an object (e.g., building 410) and surrounding the target region 12. Their real-world coordinates of points 2, 3, and 6 are known. In one embodiment, the coordinates of the target region 12 are interpolated based upon the real-world coordinates of the object features surrounding the target region 12. This can be performed based upon the assumption that the object features 455 surrounding the target region 12 are co-planar with it.

Figure 7:
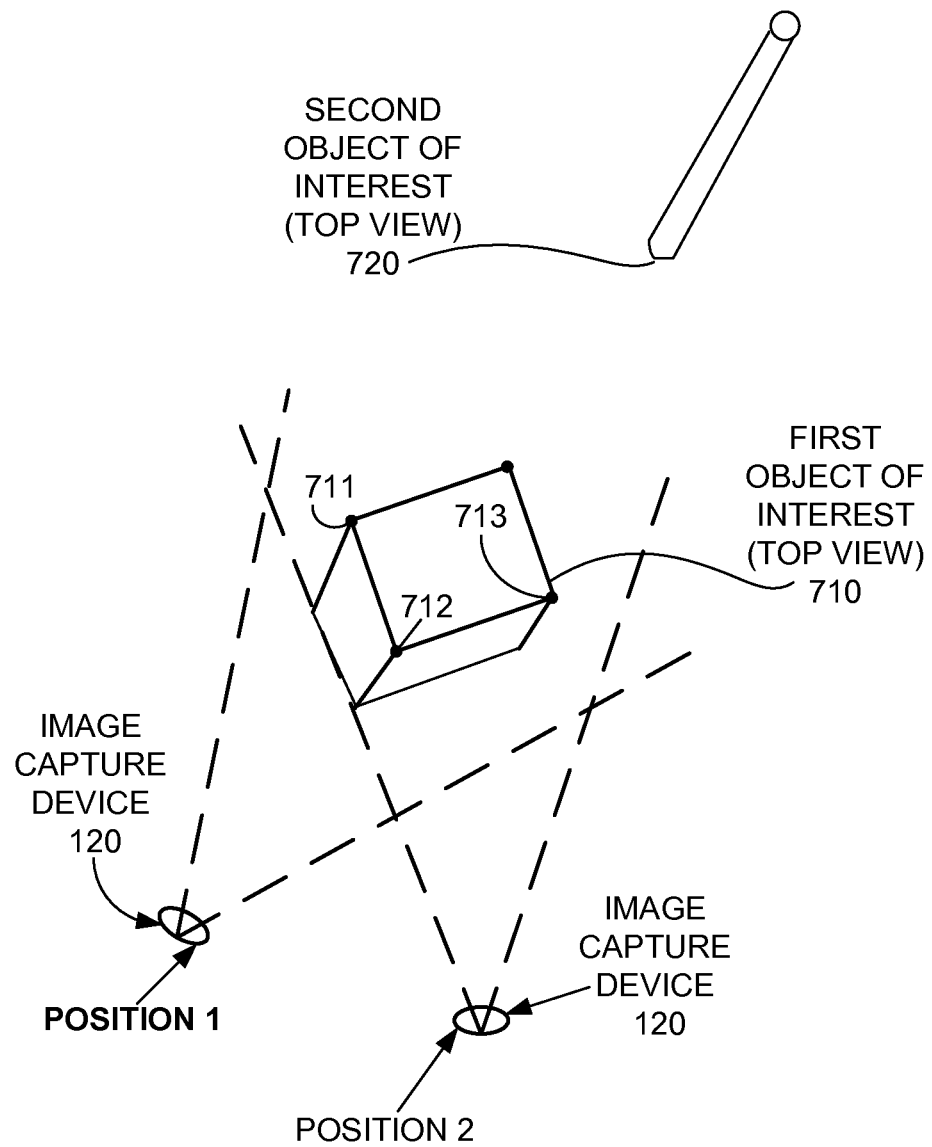
FIG. 7 is an overhead view of a plurality of objects of interest in accordance with various embodiments.

Another example is shown in FIG. 7 where a pole (e.g., second object of interest 720) is disposed behind a building (e.g., first object of interest 710). In accordance with various embodiments, it is also possible that image capture device 120 has a viewpoint that is quite different from the viewpoint in the original preparatory image survey. Thus the image 405 captured by image capture device 120 may include many shapes and features that were not visible in the first preparatory images, and that are not part of the object feature database. These are called 'out of coverage' areas. In the example of FIG. 7, points 711, 712, and 713 are considered "in coverage" areas having object feature data comprising real-world feature coordinates 454 and feature descriptors 451 stored in object feature database 280. However, second object of interest 720 is considered out of coverage area in that no object features 455 have been generated for, or stored by, image database management system 115. In FIG. 7, an image capture device 120 at position 1 captures a first image of first object of interest 710. The field of view of camera 302 is shown in FIG. 7 by the dotted lines and it is noted that second object of interest is within this field of view of camera 302 based upon its orientation at position 1. Image capture device 120 then captures a second image of first object of interest 710 at position 2. Again, the field of view of camera 302 is shown in FIG. 7 by the dotted lines and it is noted that second object of interest is also within this field of view of camera 302 based upon its orientation at position 2. It is noted that the same image capture device 120 does not need to be used to capture the image from position 1 and position 2 and that the images do not have to be taken at the same time. Thus, the image captured from position 1 could be taken one day during a vehicle based survey while the image captured from position 2 could be captured some other day using a handheld image capture device 120.

In one embodiment, it is possible to determine the positions of target regions of interest in out of coverage areas such as second object of interest 720. The method is an extension of standard photogrammetry, and uses two images of the scene from two separate camera locations. In this case, each of the two new images (e.g., from position 1 and position 2) includes both the out of coverage area that includes second object of interest 720, and also enough of the surrounding in-coverage scene (e.g., first object of interest 710) so that matching identified features 450 can be found and the geographic position and orientation of image capture device 120 can be calculated for both images as described above. In general, two images are captured from different locations. Features in both images are identified and respective feature descriptors 451 for the identified features are generated. The geographic position and orientation of each image capture device 120 for each captured image are calculated as described above. Corresponding features, including second object of interest 720, in both images are identified using, for example, matching feature descriptors 451. Then, a bundle adjustment algorithm 285 is used to calculate the real-world coordinates of the matching features using the known geographic positions at position 1 and position 2, the matching image features 453, and optionally using the known real-world feature coordinates 454. Bundle adjustment algorithms are well known in the field of visual processing and are used to resolve finding 3-D coordinates using a plurality of images from different viewpoints.

Example embodiments of the subject matter are thus described. Although various embodiments of the subject matter have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A method for matching a region on an object of interest with a geolocation in a coordinate system, said method comprising:
   capturing an image of a region of an object of interest using an image capture device at a first location;
   processing said image to detect a located feature using a feature detection algorithm, wherein said feature detection algorithm is configured to detect said located feature at a two-dimension pixel coordinate in said image for further processing;
   further processing said located feature to derive a first feature descriptor using a feature descriptor extraction algorithm, wherein said feature descriptor extraction algorithm is configured to resample an area in said image around said located feature and derive a compact representation that is usable to identify said located feature and to distinguish said located feature from other features in said image;
   storing said first feature descriptor in a memory;
   searching a database of feature descriptors having geolocation information associated with the feature descriptors, for a match to said first feature descriptor;
   determining by said image capture device a geographic position of said image capture device based upon the geolocation information associated with said first feature descriptor; and
   making said geolocation information available for access.

2. The method of claim 1 further comprising:
   sending said first feature descriptor from said image capture device to an image database; and
   matching said first feature descriptor with at least one feature descriptor stored at said image database, said at least one feature descriptor stored at said database having geolocation information associated therewith.

3. The method of claim 2 further comprising:
   determining by said image database a geographic position of said image capture device based upon the geolocation information associated with said at least one feature descriptor;
   determining by said image database an orientation of said image capture device based upon the geolocation information associated with said at least one feature descriptor; and
   conveying by said image database said geographic position and said orientation to said image capture device.

4. The method of claim 2 further comprising:
   sending by said image database to said image capture device the geolocation information associated with said at least one feature descriptor;
   storing the geolocation information associated with said at least one feature descriptor upon a database disposed upon said image capture device; and
   determining by said image capture device an orientation of said image capture device based upon the geolocation information associated with said at least one feature descriptor.

5. The method of claim 2 further comprising:
   sending an estimated location of said image capture device to said image database; and
   selecting by said image database a subset of feature descriptors to match with said first feature descriptor sent by said image capture device based upon said estimated location.

6. The method of claim 5 further comprising:
   determining by said image database a geographic position of said image capture device based upon the geolocation information associated with at least one of said subset of feature descriptors;
   determining by said image database an orientation of said image capture device based upon the geolocation information associated with said at least one of said subset of feature descriptors; and
   conveying by said image database said geographic position and said orientation to said image capture device.

7. The method of claim 5 further comprising:
   sending by said image database to said image capture device the geolocation information associated with at least one of said subset of feature descriptors;
   storing the geolocation information associated with said at least one of said subset of feature descriptors upon a database disposed upon said image capture device;
   determining by said image capture device a geographic position of said image capture device based upon the geolocation information associated with said at least one of said subset of feature descriptors; and
   determining by said image capture device an orientation of said image capture device based upon the geolocation information associated with said at least one of said subset of feature descriptors.

8. The method of claim 5 further comprising:
   sending an estimated orientation of said image capture device to said database; and
   selecting by said image database a subset of feature descriptors to match with said first feature descriptor sent by said image capture device based upon said estimated orientation, each of said subset of feature descriptors having geolocation information associated therewith.

9. The method of claim 8 further comprising:
   matching said first feature descriptor with at least one of said subset of feature descriptors;
   determining by said image database a geographic position of said image capture device based upon the geolocation information associated with said at least one of said subset of feature descriptors;

determining by said image database an orientation of said image capture device based upon the geolocation information associated with said at least one of said subset of feature descriptors; and conveying by said image database said geographic position and said orientation to said image capture device.

10. The method of claim 8 further comprising:

sending by said image database to said image capture device the geolocation information associated with at least one of said subset of feature descriptors;

storing the geolocation information associated with said at least one of said subset of feature descriptors upon a database disposed upon said image capture device;

determining by said image capture device a geographic position of said image capture device based upon the geolocation information associated with said at least one of said subset of feature descriptors; and determining by said image capture device an orientation of said image capture device based upon the geolocation information associated with said at least one of said subset of feature descriptors.

11. The method of claim 1 further comprising:

sending an estimated location of said image capture device to an image database; and selecting by said image database a subset of feature descriptors to match with said first feature descriptor sent by said image capture device based upon said estimated location, each of said subset of feature descriptors having geolocation information associated therewith.

12. The method of claim 11 further comprising:

determining by said image database a geographic position of said image capture device based upon the geolocation information associated with at least one of said subset of feature descriptors;

determining by said image database an orientation of said image capture device based upon the geolocation information associated with said at least one of said subset of feature descriptors; and conveying by said image database said geographic position and said orientation to said image capture device.

13. The method of claim 11 further comprising:

sending by said image database to said image capture device the geolocation information associated with at least one of said subset of feature descriptors;

storing the geolocation information associated with said at least one of said subset of feature descriptors upon a database disposed upon said image capture device;

determining by said image capture device a geographic position of said image capture device based upon the geolocation information associated with said at least one of said subset of feature descriptors; and determining by said image capture device an orientation of said image capture device based upon the geolocation information associated with said at least one of said subset of feature descriptors.

14. The method of claim 11 further comprising:

sending an estimated orientation of said image capture device to said database; and selecting by said image database a subset of feature descriptors to match with said first feature descriptor sent by said image capture device based upon said estimated orientation, each of said subset of feature descriptors having geolocation information associated therewith.

15. The method of claim 14 further comprising:

matching said first feature descriptor with at least one of said subset of feature descriptors;

determining by said image database a geographic position of said image capture device based upon the geolocation information associated with said at least one of said subset of feature descriptors;

determining by said image database an orientation of said image capture device based upon the geolocation information associated with said at least one of said subset of feature descriptors; and conveying by said image database said geographic position and said orientation to said image capture device.

16. The method of claim 14 further comprising:

sending by said image database to said image capture device the geolocation information associated with at least one of said subset of feature descriptors;

storing the geolocation information associated with said at least one of said subset of feature descriptors upon a database disposed upon said image capture device;

determining by said image capture device a geographic position of said image capture device based upon the geolocation information associated with said at least one of said subset of feature descriptors; and determining by said image capture device an orientation of said image capture device based upon the geolocation information associated with said at least one of said subset of feature descriptors.

17. The method of claim 1, wherein said image further comprises a second object of interest, said method further comprising:

capturing a second image of said object of interest and a second object of interest at a second location;

processing said second image to detect said located feature using said feature detection algorithm;

further processing said located feature of said second image to derive said first feature descriptor using said feature descriptor extraction algorithm;

determining a geographic position and an orientation of said image capture device at said first location and a second geographic position and a second orientation of an image capture device at said second location; and using a bundle adjustment algorithm to calculate a geographic position of said second object of interest based upon said geographic position and said orientation of said image capture device at said first location and said second geographic position and said second orientation of an image capture device at said second location.

18. The method of claim 1 further comprising:

using said geolocation information for a plurality of points of interest to derive geolocation information for a second object of interest which is co-planar with said plurality of points of interest.

19. A non-transitory computer-readable storage medium comprising computer executable code for directing a processor to executed a method for matching a region on an object of interest with a geolocation in a coordinate system, said method comprising:

capturing an image of a region of an object of interest using an image capture device at a first location;

processing said image to detect a located feature using a feature detection algorithm, wherein said feature detection algorithm is configured to detect said located feature at a two-dimension pixel coordinate in said image for further processing;

further processing said located feature to derive a first feature descriptor using a feature descriptor extraction algorithm, wherein said feature descriptor extraction algorithm is configured to resample an area in said image around said located feature and derive a compact representation that is usable to identify said located feature and to distinguish said located feature from other features in said image;

storing said first feature descriptor in a memory;

searching a database of feature descriptors having geolocation information associated with the feature descriptors, for a match to said first feature descriptor;

determining by said image capture device a geographic position of said image capture device based upon the geolocation information associated with said first feature descriptor; and making said geolocation information available for access.

20. The non-transitory computer-readable storage medium of claim 19, wherein said method further comprises:

sending said first feature descriptor from said image capture device to an image database; and matching said first feature descriptor with at least one feature descriptor stored at said image database, said at least one feature descriptor stored at said database having geolocation information associated therewith.

21. The non-transitory computer-readable storage medium of claim 20, wherein said method further comprises:

determining by said image database a geographic position of said image capture device based upon the geolocation information associated with said at least one feature descriptor;

determining by said image database an orientation of said image capture device based upon the geolocation information associated with said at least one feature descriptor; and conveying by said image database said geographic position and said orientation to said image capture device.

22. The non-transitory computer-readable storage medium of claim 20, wherein said method further comprises:

sending by said image database to said image capture device the geolocation information associated with said at least one feature descriptor;

storing the geolocation information associated with said at least one feature descriptor upon a database disposed upon said image capture device; and determining by said image capture device an orientation of said image capture device based upon the geolocation information associated with said at least one feature descriptor.

23. The non-transitory computer-readable storage medium of claim 20, wherein said method further comprises:

sending an estimated location of said image capture device to said image database; and selecting by said image database a subset of feature descriptors to match with said first feature descriptor sent by said image capture device based upon said estimated location.

24. The non-transitory computer-readable storage medium of claim 23, wherein said method further comprises:

determining by said image database a geographic position of said image capture device based upon the geolocation information associated with at least one of said subset of feature descriptors;

determining by said image database an orientation of said image capture device based upon the geolocation information associated with at least one of said subset of feature descriptors; and conveying by said image database said geographic position and said orientation to said image capture device.

25. The non-transitory computer-readable storage medium of claim 23, wherein said method further comprises:

sending by said image database to said image capture device the geolocation information associated with at least one of said subset of feature descriptors;

storing the geolocation information associated with said at least one of said subset of feature descriptors upon a database disposed upon said image capture device;

determining by said image capture device a geographic position of said image capture device based upon the geolocation information associated with said at least one of said subset of feature descriptors; and determining by said image capture device an orientation of said image capture device based upon the geolocation information associated with said at least one of said subset of feature descriptors.

26. The non-transitory computer-readable storage medium of claim 23, wherein said method further comprises:

sending an estimated orientation of said image capture device to said database; and selecting by said image database a subset of feature descriptors to match with said first feature descriptor sent by said image capture device based upon said estimated orientation, each of said subset of feature descriptors having geolocation information associated therewith.

27. The non-transitory computer-readable storage medium of claim 26, wherein said method further comprises:

matching said first feature descriptor with at least one of said subset of feature descriptors;

determining by said image database a geographic position of said image capture device based upon the geolocation information associated with said at least one of said subset of feature descriptors;

determining by said image database an orientation of said image capture device based upon the geolocation information associated with said at least one of said subset of feature descriptors; and conveying by said image database said geographic position and said orientation to said image capture device.

28. The non-transitory computer-readable storage medium of claim 26, wherein said method further comprises:

sending by said image database to said image capture device the geolocation information associated with at least one of said subset of feature descriptors;

storing the geolocation information associated with said at least one of said subset of feature descriptors upon a database disposed upon said image capture device;

determining by said image capture device a geographic position of said image capture device based upon the geolocation information associated with said at least one of said subset of feature descriptors; and determining by said image capture device an orientation of said image capture device based upon the geolocation information associated with said at least one of said subset of feature descriptors.

29. The non-transitory computer-readable storage medium of claim 19, wherein said method further comprises:

sending an estimated location of said image capture device to an image database; and selecting by said image database a subset of feature descriptors to match with said first feature descriptor sent by said image capture device based upon said estimated location, each of said subset of feature descriptors having geolocation information associated therewith.

30. The non-transitory computer-readable storage medium of claim 29, wherein said method further comprises:

determining by said image database a geographic position of said image capture device based upon the geolocation information associated with at least one of said subset of feature descriptors;

determining by said image database an orientation of said image capture device based upon the geolocation information associated with said at least one of said subset of feature descriptors; and conveying by said image database said geographic position and said orientation to said image capture device.

31. The non-transitory computer-readable storage medium of claim 29, wherein said method further comprises:

sending by said image database to said image capture device the geolocation information associated with at least one of said subset of feature descriptors;

storing the geolocation information associated with said at least one of said subset of feature descriptors upon a database disposed upon said image capture device;

determining by said image capture device a geographic position of said image capture device based upon the geolocation information associated with said at least one of said subset of feature descriptors; and determining by said image capture device an orientation of said image capture device based upon the geolocation information associated with said at least one of said subset of feature descriptors.

32. The non-transitory computer-readable storage medium of claim 29, wherein said method further comprises:

sending an estimated orientation of said image capture device to said database; and selecting by said image database a subset of feature descriptors to match with said first feature descriptor sent by said image capture device based upon said estimated orientation, each of said subset of feature descriptors having geolocation information associated therewith.

33. The non-transitory computer-readable storage medium of claim 32, wherein said method further comprises:

matching said first feature descriptor with at least one of said subset of feature descriptors;

determining by said image database a geographic position of said image capture device based upon the geolocation information associated with said at least one of said subset of feature descriptors;

determining by said image database an orientation of said image capture device based upon the geolocation information associated with said at least one of said subset of feature descriptors; and conveying by said image database said geographic position and said orientation to said image capture device.

34. The non-transitory computer-readable storage medium of claim 32, wherein said method further comprises:

sending by said image database to said image capture device the geolocation information associated with at least one of said subset of feature descriptors;

storing the geolocation information associated with said at least one of said subset of feature descriptors upon a database disposed upon said image capture device;

determining by said image capture device a geographic position of said image capture device based upon the geolocation information associated with said at least one of said subset of feature descriptors; and determining by said image capture device an orientation of said image capture device based upon the geolocation information associated with said at least one of said subset of feature descriptors.

35. The non-transitory computer-readable storage medium of claim 19, wherein said image further comprises a second object of interest, said method further comprising:

capturing a second image of said object of interest and a second object of interest at a second location;

processing said second image to detect said located feature using said feature detection algorithm;

further processing said located feature of said second image to derive said first feature descriptor using said feature descriptor extraction algorithm;

determining a geographic position and an orientation of said image capture device at said first location and a second geographic position and a second orientation of an image capture device at said second location; and using a bundle adjustment algorithm to calculate a geographic position of said second object of interest based upon said geographic position and said orientation of said image capture device at said first location and said second geographic position and said second orientation of an image capture device at said second location.

36. The non-transitory computer-readable storage medium of claim 19, wherein said method further comprises:

using said geolocation information for a plurality of points of interest to derive geolocation information for a second object of interest which is co-planar with said plurality of points of interest.

37. A system for determining the location of an image capture device, said system comprising:

an image capture device comprising:
  a camera;
  a processor coupled with a bus and configured to:
    process an image captured by said camera to detect a located feature using a feature detection algorithm, wherein said feature detection algorithm is configured to detect said located feature at a two-dimension pixel coordinate in said image for further processing;
    further process said located feature to derive a first feature descriptor using a feature descriptor extraction algorithm, wherein said feature descriptor extraction algorithm is configured to resample an area in said image around said located feature and derive a compact representation that is usable to identify said located feature and to distinguish said located feature from other features in said image; and
  a memory coupled with said bus; and an image database comprising:
  an image database memory coupled with an image database bus; and
  an image database processor coupled with said image database bus, said image database processor configured to access said first feature descriptor of an image received from said image capture device and match said first feature descriptor with a corresponding feature descriptor having geolocation information associated therewith, said image database processor further configured to make said geolocation information available for access as a result of matching said first feature descriptor with said corresponding feature descriptor and to determine a geographic position of said image capture device based upon the geolocation information associated with said first feature descriptor.

38. The system of claim 37, wherein said image database processor receives said first feature descriptor from said image capture device.

39. The system of claim 37, wherein said image database processor is further configured to generate an orientation of said image capture device based upon said geolocation information and convey said geographic position and said orientation to said image capture device.

40. The system of claim 37 wherein said image database processor is further configured to convey said corresponding feature descriptor and geolocation information to said image capture device.

41. The system of claim 37 wherein said image database processor is further configured to identify a subset of a plurality of feature descriptors having geolocation information associated therewith based upon an estimated location of said image capture device.

* * * * *